(12) United States Patent
Dehkordi

(10) Patent No.: US 11,933,994 B2
(45) Date of Patent: Mar. 19, 2024

(54) SYSTEM AND METHOD FOR APERTURE EXTENSION AND PROGRAMMABLE OPTICAL DEPTH MODULATION VIA A FIELD EVOLVING CAVITY

(71) Applicant: BRELYON Inc, San Mateo, CA (US)

(72) Inventor: Barmak Heshmat Dehkordi, San Mateo, CA (US)

(73) Assignee: BRELYON, INC., San Mateo, CA (US)

(*) Notice: Subject to any disclaimer, the term of this patent is extended or adjusted under 35 U.S.C. 154(b) by 124 days.

(21) Appl. No.: 17/302,921

(22) Filed: May 14, 2021

(65) Prior Publication Data

US 2021/0356760 A1 Nov. 18, 2021

Related U.S. Application Data

(60) Provisional application No. 63/024,975, filed on May 14, 2020.

(51) Int. Cl.
| | | |
|---|---|---|
| *G02B 27/26* | (2006.01) | |
| *G02B 27/00* | (2006.01) | |
| *G02B 27/10* | (2006.01) | |
| *G02B 30/10* | (2020.01) | |

(52) U.S. Cl.
CPC ......... *G02B 30/10* (2020.01); *G02B 27/0075* (2013.01); *G02B 27/1066* (2013.01)

(58) Field of Classification Search
CPC ............... G02B 30/10; G02B 27/0075; G02B 27/1066; G02B 27/148; G02B 13/22; H04N 13/315

USPC .......... 359/464, 634, 636, 638, 639
See application file for complete search history.

(56) References Cited

U.S. PATENT DOCUMENTS

| | | | | |
|---|---|---|---|---|
| 5,539,579 A | * | 7/1996 | Miyatake | G02B 13/22 353/30 |
| 5,883,681 A | * | 3/1999 | Kono | H04N 9/3164 348/751 |
| 6,411,437 B1 | * | 6/2002 | Cannon | G02B 27/283 359/627 |
| 2003/0197944 A1 | * | 10/2003 | Ohishi | G02B 27/148 348/E9.027 |
| 2008/0068329 A1 | * | 3/2008 | Shestak | H04N 13/315 348/E13.043 |

(Continued)

FOREIGN PATENT DOCUMENTS

WO WO2020190487 A1 9/2020

*Primary Examiner* — Audrey Y Chang
(74) *Attorney, Agent, or Firm* — Hsuanyeh Law Group PC

(57) ABSTRACT

A system for aperture extension and programmable optical depth modulation via a field evolving cavity includes at least one field evolving cavity (FEC) unit, at least one aperture unit, a plurality of cavity gates, and a plurality of aperture gates. The plurality of cavity gates is optically integrated into the at least one FEC unit. The plurality of aperture gates is optically integrated into the at least one aperture unit. At least one optical path traverses between at least one desired cavity gate from the plurality of cavity gates and at least one desired aperture gate from the plurality of aperture gates. The at least one FEC unit is configured to generate a desired image depth by adjusting a length of the at least one optical path.

5 Claims, 38 Drawing Sheets
(34 of 38 Drawing Sheet(s) Filed in Color)

(56) References Cited

U.S. PATENT DOCUMENTS

2016/0077351 A1\* 3/2016 Iwane .................. G02B 17/002
 359/489.08
2020/0150453 A1 5/2020 Dehkordi
2020/0301166 A1 9/2020 Dehkordi \* cited by examiner

84

The "N-V" engine

85

The "M" engine

SYSTEM AND METHOD FOR APERTURE EXTENSION AND PROGRAMMABLE OPTICAL DEPTH MODULATION VIA A FIELD EVOLVING CAVITY

The current application claims a priority to the U.S. Provisional Patent application Ser. No. 63/024,975 filed on May 14, 2020.

FIELD OF THE INVENTION

The present invention generally relates to lightfield displays and imaging apparatuses and more specifically for changing or programming optical paths of light and optically and electronically extending the aperture of such systems.

BACKGROUND OF THE INVENTION

Historically, the aperture of an imaging system or display system is defined by the area where the light enters or exists the imaging or display device. The size of the aperture is indicative of how much light an imaging capture can guide to its sensor or how large of a screen a display system can show. Presently, there has been an increasing traction towards more immersive lightfield and/or autostereoscopic three-dimensional (3D) displays with larger apertures and imaging systems with more compact formfactor but larger aperture due to advancement in electronics and micro fabrications. Unlike stereoscopic 3D, lightfield displays manipulate wavefronts to create depth perception at the monocular level, which can eliminate the accommodation-vergence mismatch and reduce stress on the user's eyes. There are four methods available (super multi-view, computational, multi-focal, and holographic) for realizing more realistic lightfield experiences, which each have unique weaknesses and advantages.

To begin, the super multi-view method provides a lightfield at a compact form but is limited to a reduced viewing zone and low resolution. The computational method increases resolution but produces haze and temporal flickering artifacts. The holographic method can struggle with color nonuniformity and fringing or specular artifacts. The multi-focal method can produce clean images; however, devices employing a multi-focal method are typically bulky. The following issues are typically universal to all current lightfield display methods: large bandwidth requirements; a reliance on expensive and/or advanced components that are not easily mass produced such as tunable lenses; poor color uniformity; small field of view or viewing zone; small aperture; low brightness; haze and diffraction artifacts; limited depth range; lack of compatibility with existing display drivers; bulkiness and the occasional necessity to wear specialized glasses.

These challenges have significantly limited the use of or production of lightfield displays in commercial and/or industrial settings. For example, the success of cellphone cameras has increased a need to increase lens brightness to improve performance in dark environments and also to provide more flexible optical parameters at the hardware level without the need for computational degradation of the image.

Therefore, what is needed is a thorough class of optical methods that in some embodiments uses a set of reflectors positioned in a fashion to form a cavity to provide depth or tune the optical parameters of an imaging system such as the size of the aperture. As used herein, "round trips" denotes the number of times that light circulates or bounces back and forth between the entrance and exit facets or layers of a cavity. Field evolving cavities (FECs) can delay light or increase the length of the path that light has to travel before it can exit the cavity by forcing the light to circulate between the entrance and exit half-mirrors. However, the current existing methods provide limited aperture size and/or have notable leakage of light from one depth plane to the other; or the current existing methods have limited depth range. Realizing a mechanism to extend the aperture of a lightfield display that uses a field evolving cavity (FEC) or using new optical architecture to generate depth in thinner formfactor is at the focus of the present disclosure.

An objective of the present invention is to be able to extend the FEC aperture for compact lightfield displays with larger depth range by using a polarization, optical geometry, and time multiplexing. More specifically, the present invention provides methods and systems to extract light at a desired roundtrip from an FEC optically or electronically in a programmable manner and then either actively or passively guide the light to a desired section of an extended aperture. For example, the present disclosure provides systems and methods to electronically modulate the depth of each frame and/or different sections of an image frame of the display, or in some other embodiments allows changing the focus length or zoom of a camera lens via FEC. Via methods and systems disclosed herein, the aperture can be extended to a desired size regardless of the size of the display light source for lightfield displays or sensor size for imaging sensors. The present disclosure describes four major categories of embodiments for both imaging and display applications and hybrid display-imaging applications such as augmented reality glasses and augmented reality visual effects apparatus. These embodiments are passive polarization-based extension and active extension with switchable reflectors. The embodiments are also disclosed in three sets of off axis with perpendicular emission, off axis with angular emission, and on-axis embodiments.

SUMMARY OF THE INVENTION

An objective of the present invention is to provide a display system comprising a display and an optical or electro-optical subsystem. The display is arranged to emit or transmit light rays that collectively form an image. The optical or electro-optical subsystem is optically coupled to the display and is arranged to configure the light rays path length in such a way to transform the display into lightfield display with multiple distinct two-dimensional (2D) depth layers, such that an apparent monocular and binocular depths of the image to the human viewer is deeper or closer than the actual depth of the display surface. In addition, different sections of the display are sent to different depths via half reflective surface, polarization dependent half reflective surfaces, programmable polarization dependent half reflective surface, programmable switchable mirrors, or combinations thereof.

Another objective of the present invention is to provide an optical assembly used in conjunction with displays that uses a plurality of entrance light gates and a plurality of exit light gates, which can control reflectivity and absorptivity of light via polarization control or reflectivity control in a cavity with an optical sub-assembly that forces the light to move translationally across the cavity in order to increase or program light path in a thin formfactor. The optical assembly can be an internal sub-assembly of the cavity creating an N-shape-like structure with a tilted polarization dependent between the entrance gates and the exit gates in order to translate the light from one gate to the next. The optical sub-assembly in conjunction with the display can alternatively be an internal sub-assembly of the cavity creating a V-shape-like structure with two internal gates to control or program the light path. The optical sub-assembly in conjunction with the display uses the gates that are triggered by the light from the small pixel sets on the display in order to program the time sequence of the gates via video stream. The optical sub-assembly in conjunction with the display uses the light that is entering the cavity in an oblique angle and translating between the gates in order to get to the aperture area and exit to the outside world. Moreover, the post aperture optics using polarization and angled surfaces are able to correct for the exit light from the cavity.

Another objective of the present invention is to provide a display system that allows the aperture of the display to be extended by programming the light path to tile a larger surface area at the exit gates using time sequencing of the gates or using polarization.

Another objective of the present invention is to provide an imaging system comprising: a lens, a sensor, and an optical or electro-optical subsystem. The lens and the sensor are arranged to absorb the light rays that collectively form an image. The optical or electro-optical subsystem is optically coupled in between the lens and the sensor and is arranged to configure the light rays path length in such a way to transform the camera optical path into multifocal or multi-zoom. In addition, different sections of the sensor receive different depths via half reflective surfaces, polarization dependent half reflective surfaces, programmable polarization dependent half reflective surface, switchable mirrors, or combinations thereof.

Another objective of the present invention is to provide an optical assembly used in conjunction with an imaging sensor that uses a plurality of entrance light gates and a plurality of exit light gates, which can control reflectivity and absorptivity of light via polarization control or reflectivity control in a cavity with an optical sub-assembly. The optical sub-assembly forces the light to translationally move across the cavity in order to increase or program light path in a thin formfactor for a compact optical system or multifocal or multi-zoom or multi-color (multi-spectral) capability.

BRIEF DESCRIPTION OF THE DRAWINGS

The file of this patent or application contains at least one drawing/photograph executed in color. Copies of this patent with color drawing(s)/photograph(s) will be provided by the Office upon request and payment of the necessary fee.

DETAILED DESCRIPTION OF THE INVENTION

Figure 1A:
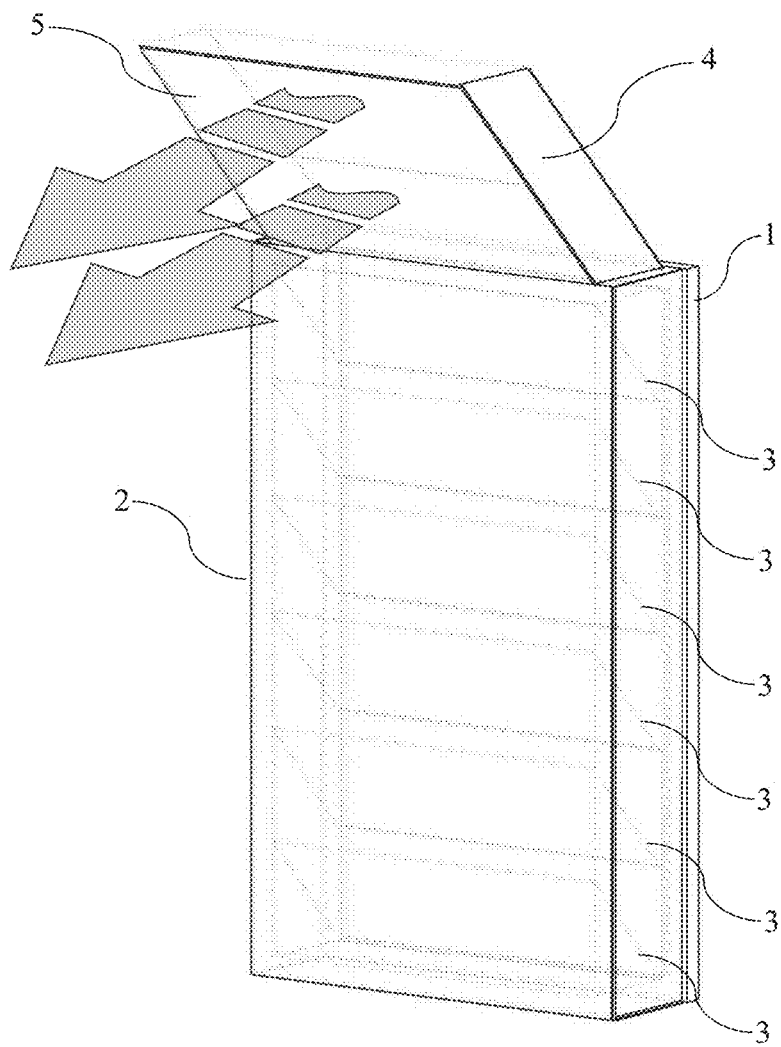
FIG. 1A illustrates a perspective view of an example embodiment for present invention when used for depth modulation for displays with passive polarization-based aperture extension with a field evolving cavity (FEC) with perpendicular emission.

All illustrations of the drawings are for the purpose of describing selected versions of the present invention and are not intended to limit the scope of the present invention.

Terminology and Lexicography

In the present disclosure, all references to "user" or "users" pertain to either individual or individuals who would utilize the present invention.

Further, in the present disclosure, all references to "arbitrarily engineered" pertain to being any shape, size, material, features, type or kind, orientation, location, quantity, components, and arrangements of components with single or an array of components that would allow the present invention or that specific component to fulfill the objectives and intents of the present invention or that specific component within the present invention.

Further, in the present disclosure, all references to "lightfield" at a plane pertain to a vector field that describes the amount of light flowing in every or several selected directions through every point in that plane. Lightfield is the description of angle and intensity of light rays traveling through that plane.

Further, in the present disclosure, all references to "depth modulation" pertain to change, programming, or variation of monocular optical depth of the display or image. Monocular optical depth is a depth that directly refers to the curvature of the wavefront of the light and does not require both eyes or stereopsis to be perceived. Monocular depth is directly related to the distance of the object or an image or a display. When an emissive image (e.g., an illuminated object or a display) is moved further away from an observer the emitted light has to travel longer distance. Sine each point emits a spherical wavefront, as the distance that light has propagated increases, the radius of the sphere increases, and the surface of the sphere also known as the wavefront will become more and more flat. This reduction in the curvature translate to deeper depth perceived by human eye or a camera. Evolution of a wavefront refers to change in curvature of the wavefront as a result of propagation of light.

Further, in the present disclosure, all references to "optically coupled" pertains to one element being adapted to impart, transfer, feed, or direct light to another element either directly or indirectly.

Further, in the present disclosure, all references to "chief rays" pertain to the center axis of the light cone that is coming from a pixel or point in space.

Further, in the present disclosure, all references to "Field Evolving Cavity" (FEC) pertain to a non-resonant (e.g., unstable) cavity that allows light to reflect back and forth within its reflectors to evolve the shape of the wavefront associated with the light in a physical space. One example of a FEC may be comprised two or more half-mirrors or semi-transparent mirrors facing each other. As described herein, an FEC may be parallel to a display plane (in case of display systems) or an entrance pupil plane (in case of imaging systems). An FEC may be used for changing the apparent depth of a display or a section of the display. For an FEC, the light bounces back and forth or circulates inside the facets of the cavity. Each of these propagations is referred to as a pass. For example, if there are two reflectors for the FEC, then one reflector is at the light source side, and another reflector is at the exit side. The first time that light propagates from the entrance reflector to the exit reflector is referred to as forward pass, and the light or part of light that is reflected back from the exit facet to the entrance facet is referred to as backward pass because the light is propagating backward toward the light source. In a cavity, once the light completes once cycle and comes back to the enter facet, the distance of that propagation is referred to as one round trip. FEC can have infinite different architectures but principle is always the same; an FEC as defined previously is an optical architecture that creates multiple paths for light to travel in either through forcing light to go through higher number of round trips or by forcing light from different sections of the same display to travel to different distances before those paths of light exit the cavity.

Further, in the present disclosure, all references to "coaxial FEC" pertain to the light exiting the cavity close to the same axis that the light entered the cavity that FEC.

Further, in the present disclosure, all references to "off-axis FEC" or "FEC with perpendicular emission" pertain to the light exiting the cavity perpendicular to the angle the light entered the cavity.

Further, in the present disclosure, all references to "FEC with angled emission" pertain to the light exiting the cavity with a notable angle.

There is notable difference in the architecture of a coaxial FEC, FEC with perpendicular emission, and FEC with angled emission, and each architecture has its own advantages and disadvantages. Coaxial FECs are usually compact but have light leakage problem between different depth. FECs with perpendicular emission have no light leakage but are bulky. FECs with angled emission have great formfactor and low light leakage but they need to be viewed at an angle, and, therefore, FECs with angled emission typically have very small aperture.

Further, in the present disclosure, all references to "aperture of a display system" pertain to the surface where the light exits the display system toward the exit pupil of the display system. The aperture is a physical surface while the exit pupil is an imaginary surface that may or may not be superimposed on the aperture. The light after exit pupil enters the outside world.

Further, in the present disclosure, all references to "aperture for imaging systems" pertain to the area or surface where the light enters the imaging system after the enter pupil of the imaging system and goes toward the sensor. The enter pupil is an imaginary surface or plane where the light first enters the imaging system.

Further, in the present disclosure, all references to "display" pertain to an emissive display which can be based on any technology including, but not limited to, Liquid Crystal Displays ("LCD"), Thin-film Transistor ("TFT"), Light Emitting Diode ("LED"), Organic Light Emitting Diode arrays ("OLED"), Active Matrix Organic Light Emitting Diode ("AMOLED"), projection or angular projection arrays on flat screen or angle dependent diffusive screen or any other display technology) and/or mirrors and/or half mirrors and/or switchable mirrors or liquid crystal sheets arranged and assembled in such a way as to exit bundles of light with divergence apex at different depths or one depth from the core plane or waveguide based displays. The display might be a near eye display for a headset, a near head display, or far standing display. The application of the display does not impact the principle of the present invention, and this is what is referred to by an emissive display in the present invention.

Further, in the present disclosure, all references to "angular profiling" may be achieved by holographic optical elements ("HOE"), diffractive optical elements ("DOE"), lens, concave or convex mirrors, lens arrays, micro lens arrays, aperture arrays, optical phase or intensity masks, digital mirror devices ("DMDs"), Spatial light modulators ("SLMs"), metasurfaces, diffraction gratings, interferometric films, privacy films, or other methods. The intensity profiling may be achieved by absorptive or reflective polarizers, absorptive coatings, gradient coatings, or other methods. The color or wavelength profiling may be achieved by color filters, absorptive notch filters, interference thin films, or other methods. The polarization profiling may be achieved by metasurfaces with metallic or dielectric, micro or nano structures, wire grids, absorptive polarizers, wave plates such as quarter waveplates, half waveplates, 1/x waveplates, or other nonlinear crystals with an isotropy or spatially profiled waveplates.

All such these components can be arbitrarily engineered to deliver the desired profile. Further, in the present disclosure, all references to "arbitrary optical parameter variation" pertain to variations, change, modulation, programing, and/or control of parameters which can be one or collection of following variations namely: optical zoom change, aperture size and aperture brightness variation, focus variation, aberration variation, focal length variation, time-of-flight or phase variation in case of an imaging system with time sensitive or phase sensitive imaging sensor, color variation or spectral variation in case spectrum sensitive sensor, angular variation of captured image, variation in depth of field, variation of depth of focus, variation of coma, variation of stereopsis baseline in case of stereoscopic acquisition, variation of field of view of the lens.

Further, in the present disclosure, all references to "active design", "active components", or generally the adjective "active" pertain to a design or component that has variable optical properties that can be changed with another optical or electrical signal. Electro-optical materials such as liquid crystals (LC), liquid crystal as variable retarder (LCVR), or piezoelectric materials layers with Pockel's effects (also known as electro-optical refractive index variation) such as lithium niobate ("LiNbO$_3$"), lithium tantalate ("LiTaO$_3$"), potassium titanyl phosphate ("KTP"), and β-barium borate ("BBO") with transparent electrodes on both sides to enforce electric field for change of refractive index. The EO material can be arbitrarily engineered. Passive design or component is referred to a design that does not have any active component other than the display.

Further, in the present disclosure, all references to "pass angle" of a polarizer pertain to the angle in which the incident light with normal incident to the surface of the polarizer can pass through the polarizer with maximum intensity Further, in the present disclosure, all references to when two items are "cross polarized" pertain to a polarization status or orientation is in orthogonal status with regards to one another. For example, when two linear polarizers are cross polarized; it means that their pass angle have 90 degrees difference.

Further, in the present disclosure, all references to a "reflective polarizer" pertain to a polarizer which allows the light that has polarization aligned with the pass angle of the polarizer to transmit through the polarizer and it will reflect the light that is cross polarized with its pass axis.

Further, in the present disclosure, all references to a "wire grid polarizer" pertains to a reflective polarizer made with nano wires aligned in parallel, which is a non-limiting example of such polarizer.

Further, in the present disclosure, all references to an "absorptive polarizer" pertains to a polarizer that allows the light with polarization aligned with pass angle of the polarizer to pass through and that absorbs the cross polarized light.

Further, in the present disclosure, all references to a "beam splitter" pertains to a semi-reflective layer that reflects a certain desired percentage of the intensity of the light regardless of its polarization and that lets the rest of the light to pass through. A simple example of a beam splitter is a glass slab with semi-transparent silver coating or dielectric coating on it which allows 50% of the light to pass through and it reflects the other 50%.

Further, in the present disclosure, all references to an "imaging sensor" may use "arbitrary image sensing technologies" to capture light or a certain parameter of light that is exposed onto it. Examples of such "arbitrary image sensing technologies" include complementary-symmetry metal-oxide-semiconductor ("CMOS"), Single Photon Avalanche Diode ("SPAD") array, Charge Coupled Device ("CCD"), Intensified Charge Coupled Device ("ICCD"), Ultra-fast streak sensor, Time-of-Flight sensor ("ToF"), Schottky diodes, or any other light or electromagnetic sensing mechanism for shorter or longer wavelength.

Further, in the present disclosure, all references to "imaging system" pertain to any apparatus that acquires an image that is a matrix of information about light intensity and/or its other, temporal, spectral, polarization or entanglement or other properties used in any application or frame work such as cellphone cameras, industrial cameras, photography or videography cameras, microscopes, telescopes, spectrometers, time-of-flight cameras, ultrafast cameras, thermal cameras, or any other type of imaging system.

Overview

An explanation for each of the categories of embodiments is provided in further detail hereinafter, but an explanation of the major components and typical architectures is necessary for the present disclosure. The present invention may be arbitrarily engineered. However, the present invention may comprise at least one emissive display 1 or image source for display embodiments, and the emissive display 1 may comprise an imaging sensor 36 for imaging embodiments. In some embodiments for displays, the light starts from an emissive display 1, then goes through a set of pre-cavity optics, and finally goes through an FEC 2. Moreover, the FEC 2 includes initially going through at least one desired enter gate from a plurality of enter gates 3 and finally exiting the aperture 4 through at least one desired exit gate from a plurality of exit gates 5 through an imaginary exit pupil and into the world. In some other embodiments, the light travels in the opposite direction in imaging systems, wherein the light initially enters an imaginary enter pupil and a lens system, then enters an aperture box, then goes through FEC 2, and then sent to the imaging sensor 36.

Figure 1B:
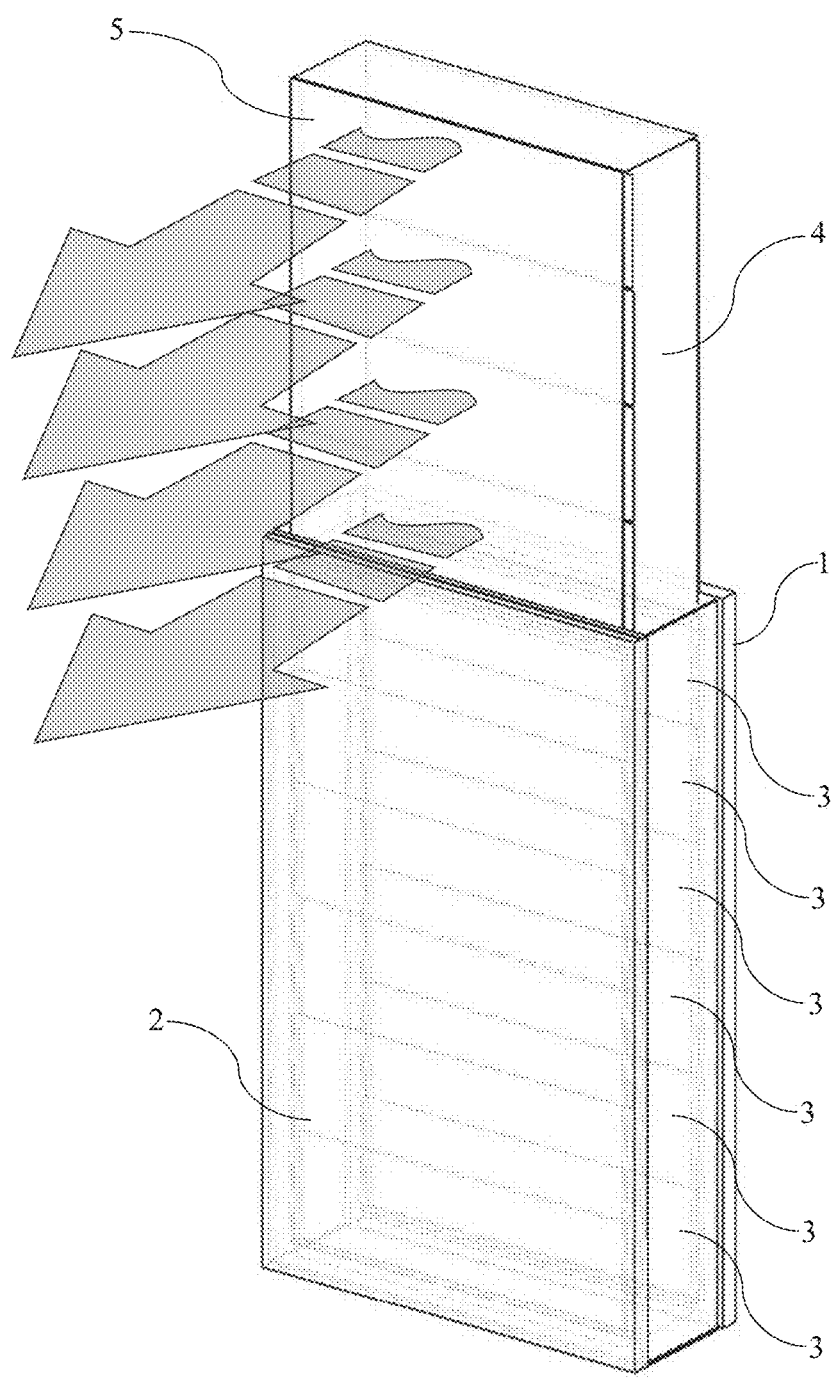
FIG. 1B illustrates a perspective view of an example embodiment for present invention when used for depth modulation for displays with passive polarization-based aperture extension with an FEC with angled emission.
Figure 1C:
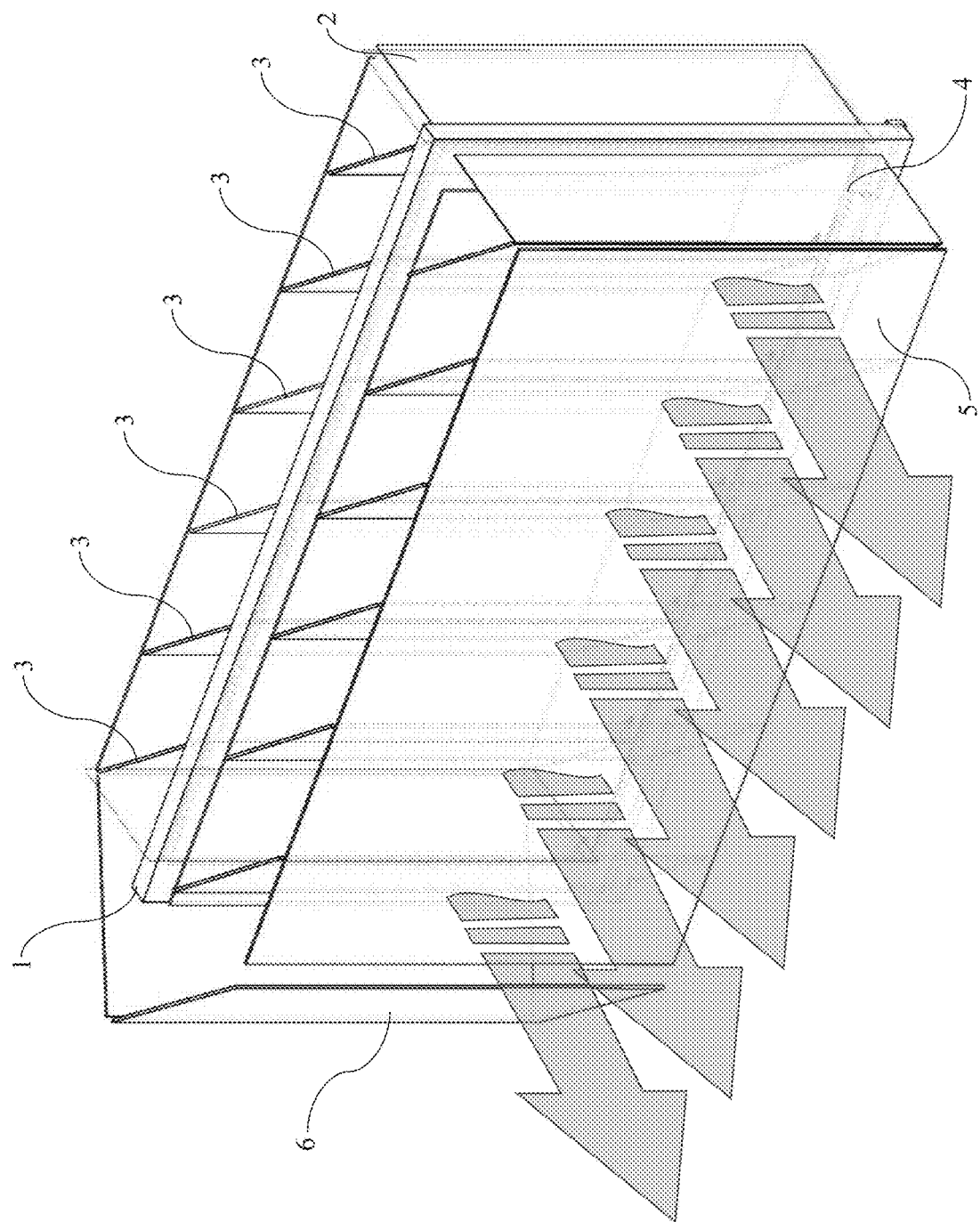
FIG. 1C illustrates a perspective view of an example embodiment for present invention when used for depth modulation for displays with active time multiplexed aperture extension with an FEC with perpendicular emission and folded aperture.
Figure 1D:
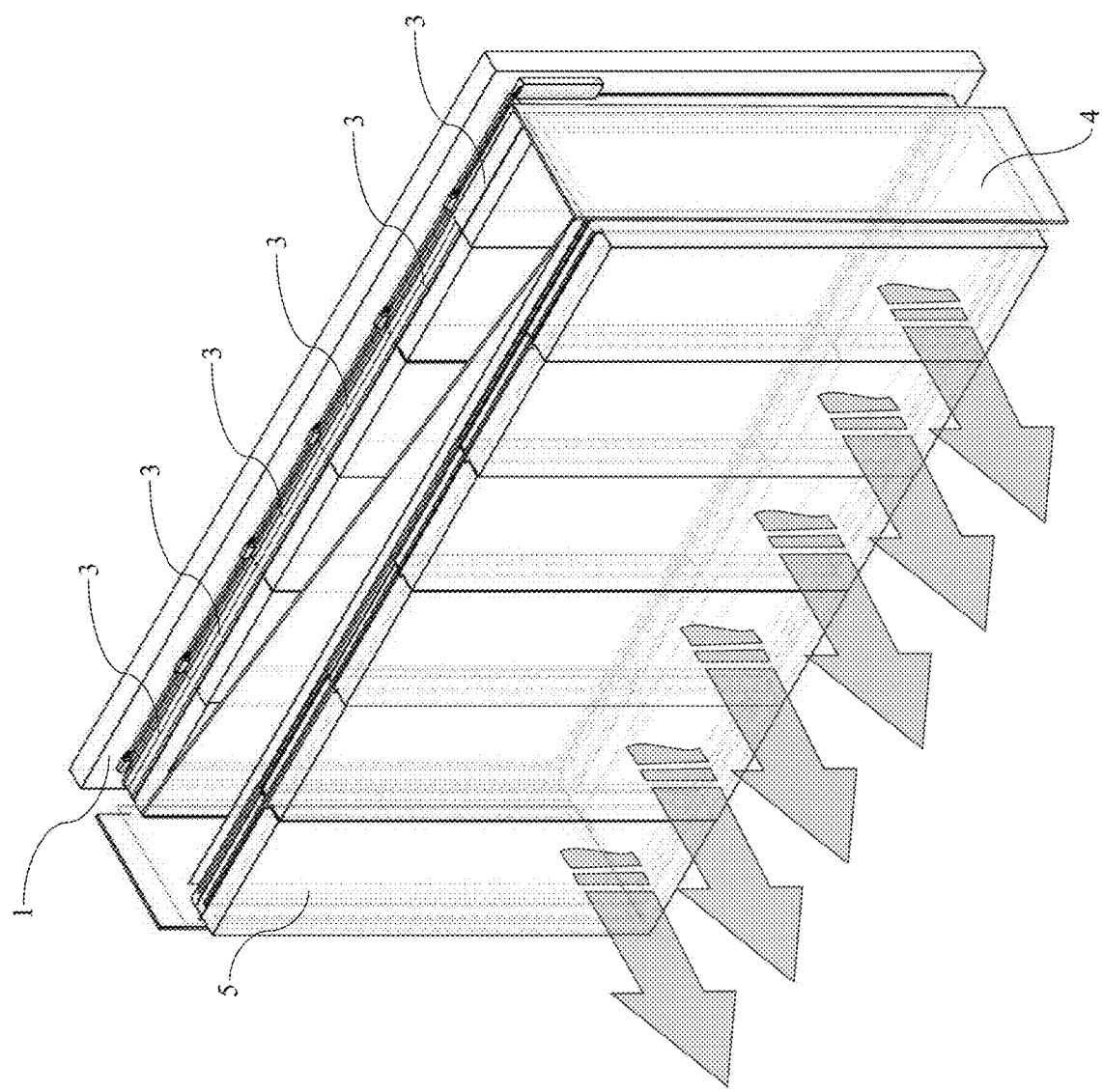
FIG. 1D illustrates a perspective view of an example embodiment for present invention when used for depth modulation for displays with active time multiplexed aperture extension with a coaxial FEC also referred to as the "N" engine.

FIGS. 1A, 1B, 1C, and 1D depicts a set of example embodiments that represent four different family of architectures for aperture extension. FIG. 1A illustrates a perspective view of an example embodiment for displays with passive polarization-based aperture extension with an FEC with perpendicular emission. FIG. 1B is an example embodiment of displays with passive polarization-based aperture extension with an FEC with angled emission. FIG. 1C is an example embodiment for present invention when used for depth modulation for displays with active time multiplexed aperture extension with an FEC with perpendicular emission and folded aperture. FIG. 1D illustrates a perspective view of an example embodiment for present invention when used for depth modulation for displays with active time-multiplexed aperture extension with a coaxial FEC also referred to as the "N" engine.

As can be seen in FIG. 1A, the light is generated at a vertically positioned emissive display 1. The FEC 2 receives the light through a desired enter gate (i.e., also may also be referred to as a "desired enter cell") from the plurality of enter gates 3. Each of the plurality of enter gates 3 is a set of layers or an optical sub architecture of an FEC 2 that passively or actively manipulates the angle and/or polarization of the light so that the light can enter the cavity at a desired time, polarization and location, and with the desired angle or depth. In further reference to FIG. 1A, the FEC 2 allows for perpendicular emission because the plurality of enter gates 3 is just simple passive semi-reflective mirrors (also known as beam splitter). The light after entering the FEC 2 is guided up toward the aperture 4 (i.e., may also be referred to as an "aperture box"). The light then exits the aperture 4 at a desired exit gate from the plurality of exit gates 5 depending on the polarization of the light. There is no active optical component in this architecture.

FIG. 1B is another example embodiment of displays with passive polarization-based aperture extension with an FEC with angled emission. In this embodiment, the light or image is generated at two vertically positioned emissive displays 1, and the FEC 2 then receives the light through a desired enter gate from the plurality of enter gates 3 at an angle that is typically 45 degrees to vertical axis. The light then comes out of the FEC 2 at an angle (this is why we refer to this type of FEC 2 as an FEC with angular emission). The light enters the aperture 4 at an angle that is either +45 degrees or −45 degrees; and the light then exits aperture 4 at a desired exit gate from the plurality of exit gates 5 at 45 degrees angle. Each of the plurality of enter gates 3 is a set of layers or an optical sub architecture of an FEC 2 that passively or actively manipulates the angle and/or polarization of the light so that the light can enter the cavity at a desired time, polarization and location, and with the desired angle or depth.

FIG. 1C is another example embodiment of displays with active aperture extension with an active off-axis FEC with perpendicular emission. In this embodiment, the light or image is generated at an emissive display 1 that is at the back of the system behind the aperture 4, and the FEC 2 receives the light through a desired enter gate from the plurality of enter gates 3. In this embodiment, each of the plurality of enter gates 3 is a set of electro-optical reflectors that sequentially turn reflective and transparent. The light then comes out of the FEC 2 and through a reflective relay 6. In this embodiment, the reflective relay 6 is two mirrors set with 90 degrees horizontal angle at the left side of the device. After the light travels through the reflective relay 6, the light comes to the aperture 4 in a perpendicular fashion. The light then exits the aperture 4 perpendicular to the surface of the aperture 4 at the location where a desired exit gate from the plurality of exit gates 5 is set to be reflective. The other exit gates from the plurality of exit gates 5 are all transparent or set as off.

FIG. 1D is another example embodiment of displays with active aperture extension with an active coaxial FEC. In this embodiment, the light or image is generated at an emissive display 1 that is at the back of the system at the back of the aperture 4, and the FEC 2 receives the light through a desired enter gate from the plurality of enter gates 3. In this embodiment, each of the plurality of enter gates 3 is a set of electro-optical reflectors that sequentially turn reflective and transparent. The light then comes out of the FEC 2, which is superimposed with the aperture 4, and exits the aperture 4 at a desired exit gate from the plurality of exit gates 5 at the angle that is parallel to the surface normal axis of the display surface. This coaxial nature of this embodiment allows for it to be extremely compact. This embodiment is referred to as "N" engine throughout the present disclosure as the geometry of the FEC optics creates a shape that resembles the letter "N". The "N" engine is an optical system with coaxial FEC and superimposed active aperture.

The gray arrays show the direction of the chief ray of bundles of light exiting the system.

Figure 2A:
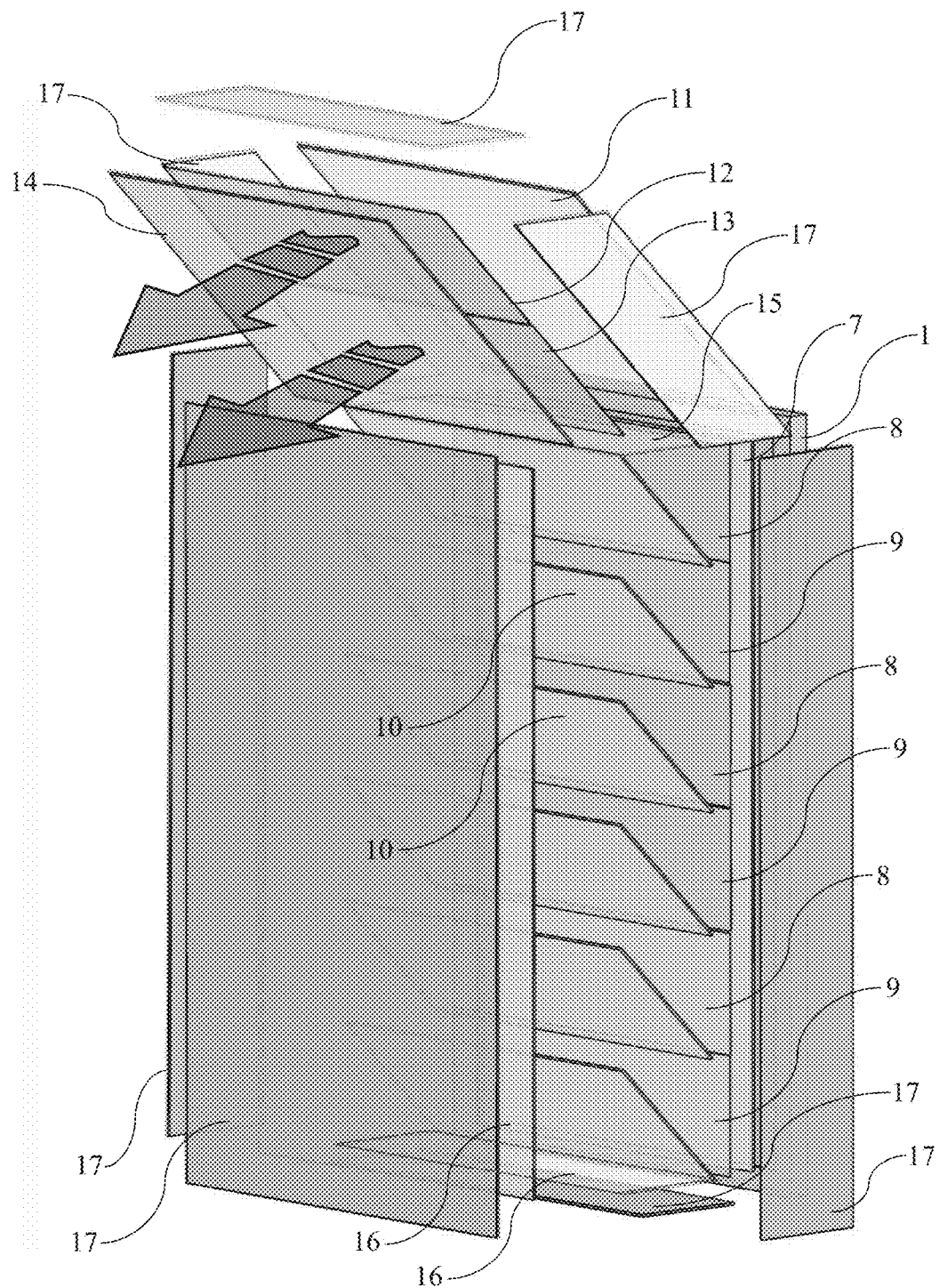
FIG. 2A illustrates a perspective view of the exploded 3D model of the embodiment in FIG. 1A which is a lightfield display with passive polarization-based aperture extension and an FEC with perpendicular emission.

FIG. 2A illustrates a perspective view of the exploded 3D model of the embodiment in FIG. 1A. This is an example lightfield display with passive polarization-based aperture extension and an FEC with perpendicular emission which can be arbitrarily engineered. In this embodiment, the light is generated at an emissive display 1 and goes through an angular profiling layer 7 such as a privacy film. Next, the light goes through either a first polarization-adjusting device 8 or a second polarization-adjusting device 9, which are half waveplate or some type of waveplate to make the light be polarized at X state and at Y state such that the X and Y are orthogonal to each other. For example, the X state can be a linear horizontal polarization, while the Y state is a linear vertical polarization. If the light from the emissive display 1 has a linear horizontal polarization, the first polarization-adjusting device 8 would then be half waveplate, and the second polarization-adjusting device 9 would then be just a transparent layer or would not be needed. Alternatively, if the light from the emissive display 1 has a circular polarization, the first polarization-adjusting device 8 would then be a quarter waveplate to convert the light into Y polarization, the second polarization-adjustment device 9 would then be another quarter waveplate to convert the light into X polarization. Afterwards, the light would hit at least one beam splitter 10 so that the light is partially reflected 90 degrees up toward the exit of the FEC 2. The light then enters the aperture 4 and then exits the aperture 4 from two exits gates 5 to the outside world as shown by large arrows. A mirror 11 is positioned at the back of the aperture 4. A first reflective polarizer 12 with a pass axis parallel to Y such as a wire grid polarizer, and a second reflective polarizer 13 is cross polarized with the first reflective polarizer 12 so that the second reflective polarizer 13 reflects Y polarized light but passes X polarized light. An absorptive polarizer 14 such as a protective glass is used to mechanically support with the first reflective polarizer 12 and the second reflective polarizer 13. In some embodiments, the absorptive polarizer 14 reduces the ambient reflection from the surface of the aperture 4. A transmissive baffle layer 15 angularly profiles the light that passes through it in order to filter the unwanted stray lights from entering the aperture 4. An absorptive layer 16 such as black velvet or black paint is used to absorb the unwanted light and reduce light leakage. A plurality of cover pieces 17 is used to keep optical components in place and block ambient light to get into the system.

Figure 2B:
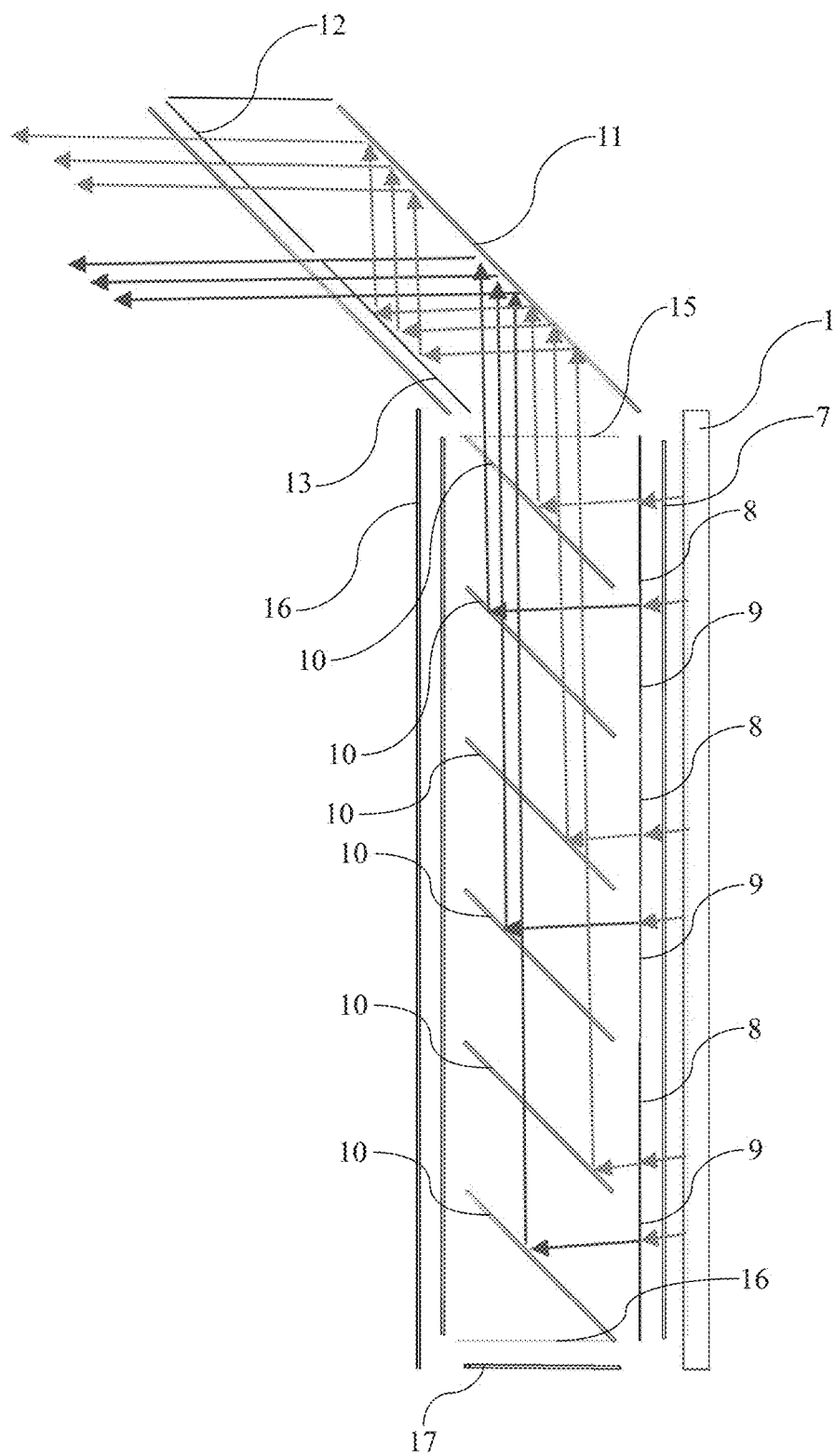
FIG. 2B illustrates a side view of the embodiment in FIG. 1A and the light paths inside the system which is a lightfield display with passive polarization-based aperture extension and an FEC with perpendicular emission.

FIG. 2B illustrates a side view of the embodiment in FIG. 1A, while the light paths inside the system. As can be seen, the light exits an emissive display 1, then passes through an angular profiling layer 7, then has its polarization changed to X and Y via a first polarization-adjusting device 8 and a second polarization-adjusting device 9 at different sections of the emissive display 1 in an interlaced fashion such that each period of these sections would exit the aperture 4 with same light path. This is very important for aperture extension as it allows the two pieces of screen to perfectly tile together at the desired depth.

As can be seen in FIG. 2B, each pair of X-Y polarized light is emitted from the section pairs of the FEC 2, and the light path from the further section is longer in the FEC 2, but the same light path is shorter and perfectly compensated in aperture 4. Thus, each pair of X-Y polarized light travels the same distance to the exit of the aperture 4 and therefore appears to be at the same depth but at different heights while vertically tiling each other. Those deeper (lower) sections from each pair of X-Y polarized light only once reflect off the mirror 11 of the aperture 4 and exit at the bottom of the aperture 4 at the second reflective polarizer 13. Moreover, the second reflective polarizer 13 reflects the light that is cross polarized by the second reflective polarizer 13. In addition, those upper sections from each pair of X-Y polarized light in FEC 2 (that is the light passing through the first polarization-adjusting device 8 such as retarders) reflect off the mirror 11 of the aperture 4. However, since those upper sections are cross polarized by the second reflective polarizer 13, those upper sections reflect up and again hit the mirror 11 for the second time. Consequently, those upper sections are translated to higher section of the aperture and then exits at the first reflective polarizer 12, which is because those upper sections have a polarization aligned with the pass angle of the first reflective polarizer 12. Each pair of X-Y polarized light in this embodiment creates one depth and by tiling in the explained fashion, and the aperture 4 of the lightfield system consequently is expanded by factor of two, which allows the aperture 4 to be twice as large as the aperture of the FEC that is feeding the aperture 4. This is important because a thinner smaller FEC can have an image/screen that is two times larger by using the present invention.

Figure 3A:
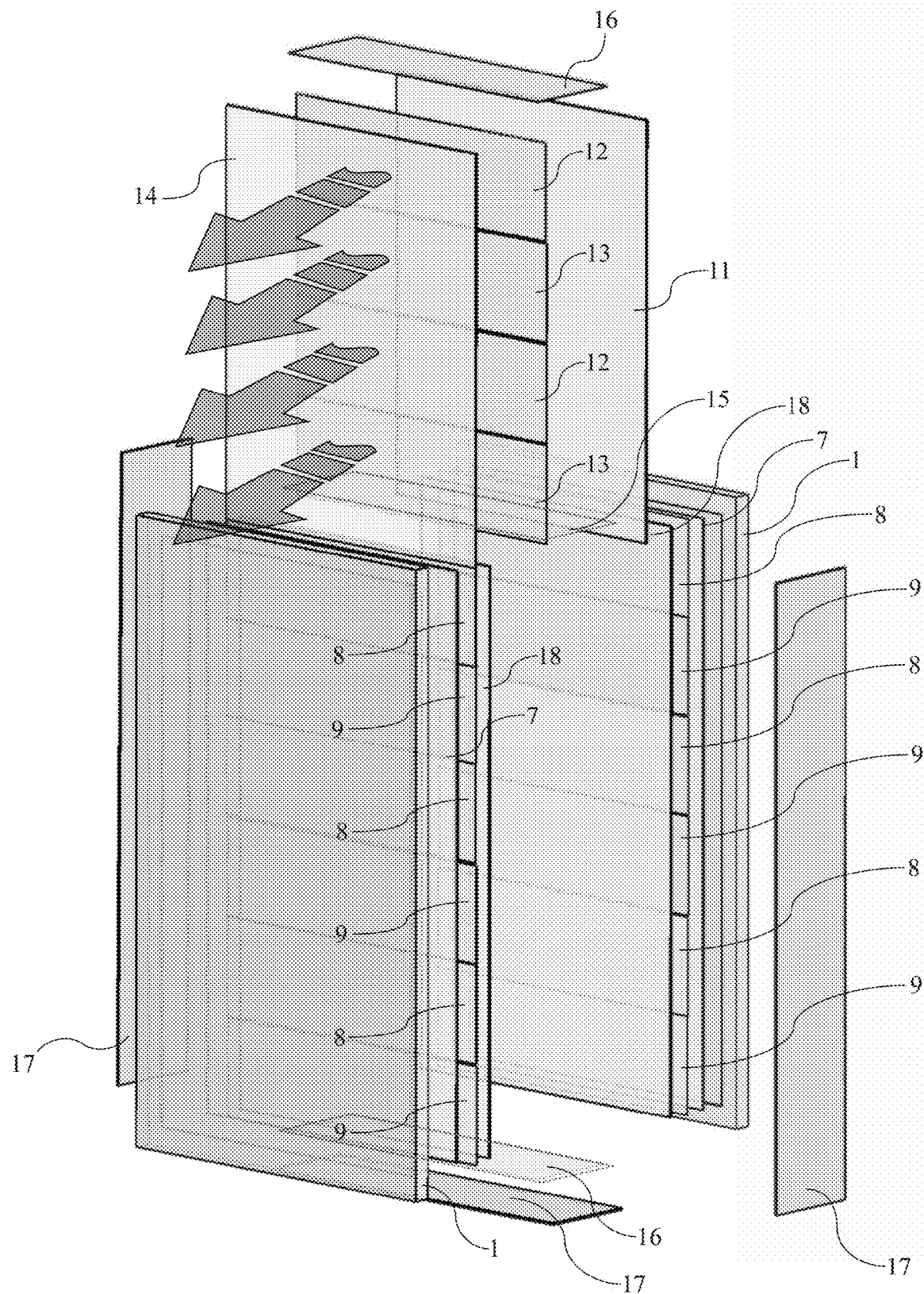
FIG. 3A illustrates a perspective view of the exploded 3D model of the embodiment in FIG. 1B which is a lightfield display with passive polarization-based aperture extension and an FEC with angled emission.

FIG. 3A depicts a perspective view of the exploded 3D model of the embodiment in FIG. 1B. This embodiment is an example lightfield display with a passive polarization-based aperture extension and an FEC with angled emission, which can be arbitrarily engineered. In this embodiment, the light is generated at two emissive displays 1 (i.e., one display on the left and another display on the right), which are positioned at two sides of the FEC 2. The light from each of the two emissive displays 1 begins by travelling through the angular profiling layer 7 such as privacy film with maximum pass angle of 45 degree upward (towards the aperture 4 at the top). The light then goes through either the first polarization-adjusting device 8 or the second polarization-adjusting device 9, which are half waveplate or some type of waveplate to make the light being polarized at X state and at Y state such that the X state and Y state are orthogonal to each other. For example, the X state can be a linear horizontal polarization, while the Y state is a linear vertical polarization. If the light from the emissive display 1 has a linear horizontal polarization, the first polarization-adjusting device 8 would then be half waveplate, and the second polarization-adjusting device 9 would then be just a transparent layer or would not be needed. Alternatively, if the light from the emissive display 1 has a circular polarization, the first polarization-adjusting device 8 would then be a quarter waveplate to convert the light into Y polarization, the second polarization-adjustment device 9 would then be another quarter waveplate to convert the light into X polarization. Afterwards, the light would pass through at least one beam splitting layer 18, which is aligned and flush to the first polarization-adjusting device 8 and the second polarization-adjusting device 9 as layers and is parallel to an output surface of the emissive display 1. The beam splitting layer 18 also has a spatial reflectivity profile so that the reflectivity of the beam splitting layer 18 increases from bottom to top of the FEC 2. Thus, the beam splitting layer 18 is used to allow the light rays that has a higher number of reflections inside the FEC 2 to have equal intensity with the light rays that enter the FEC 2 at the top. After several reflections, the light exits the FEC 2 at a desired height, not only depending on the polarization, but also depending on which angle that the light entered the aperture 4. The absorptive layer 16 can be, but is not limited to, velvet or black paint, while the plurality of cover pieces 17 is used to mechanically hold the layers and optical components in place and is used to block ambient light from getting into the system. The transmissive baffle layer 15 is used to eliminate the stray light within the FEC 2 from entering the aperture 4.

Figure 3B:
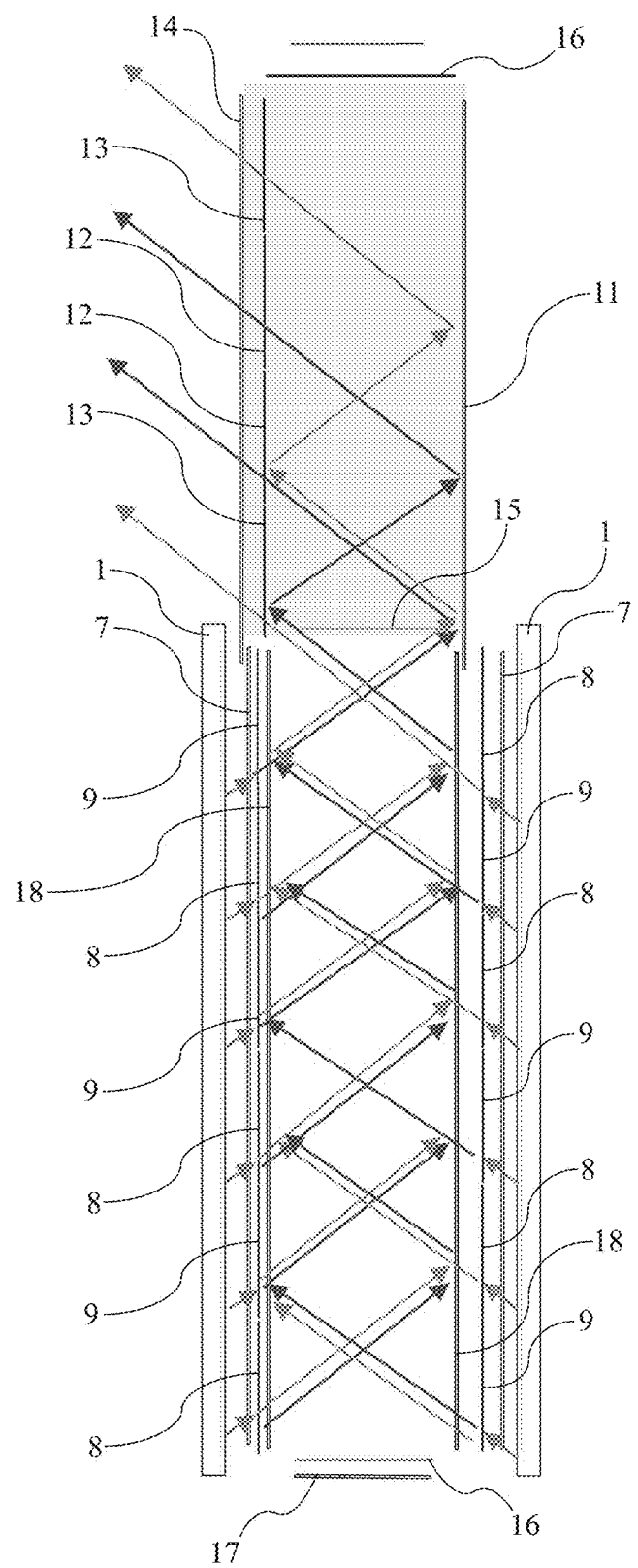
FIG. 3B illustrates a side view of the embodiment in FIG. 1B and the light paths inside the system which is a lightfield display with passive polarization-based aperture extension and an FEC with angled emission.

FIG. 3B illustrates a side view of the embodiment in FIG. 1B, while the light paths inside the system, which is a lightfield display with passive polarization-based aperture extension and an FEC with angled emission. In this embodiment, the light from each of the two emissive displays 1 reflects upward in 90-degree reflections from two beam splitting layers 18 on each side of the FEC 2. Since the light from each section of each of the two emissive displays 1 has a different polarization, the light is only allowed to exit the aperture 4 at the place where the pass angle of the first reflective polarizer 12 and the second reflective polarizer 13 allows the light to pass. Otherwise, the light travels further up via reflecting from the mirror 11 of the aperture 4. The distance that is travelled by each polarization and angle are designed in such a fashion that each polarization and angle would perfectly and continuously tile the same depth from four sections of two different emissive displays 1 feeding the FEC 2. In some simpler embodiments, the FEC 2 has a single emissive display 1 on one side and has just a mirror on the other side. In either case, the aperture extension is achieved via X polarized +45 degree; X polarized −45 degree; Y polarized +45 degrees; and Y polarized −45 degrees.

All of the light that is exiting the aperture 4 from different exit gates 5 have the same angle in the chief ray that is angled at 45 degrees relative to the exit surface of the aperture 4. This angle can be undesirable in some applications, and post aperture optics may be able to correct for this angle so that the chief ray of the light becomes perpendicular. One of the advantages of this design is the simplicity of the FEC structure which does not require angled beam splitters 10 as was needed in FIG. 1A.

Figure 4A:
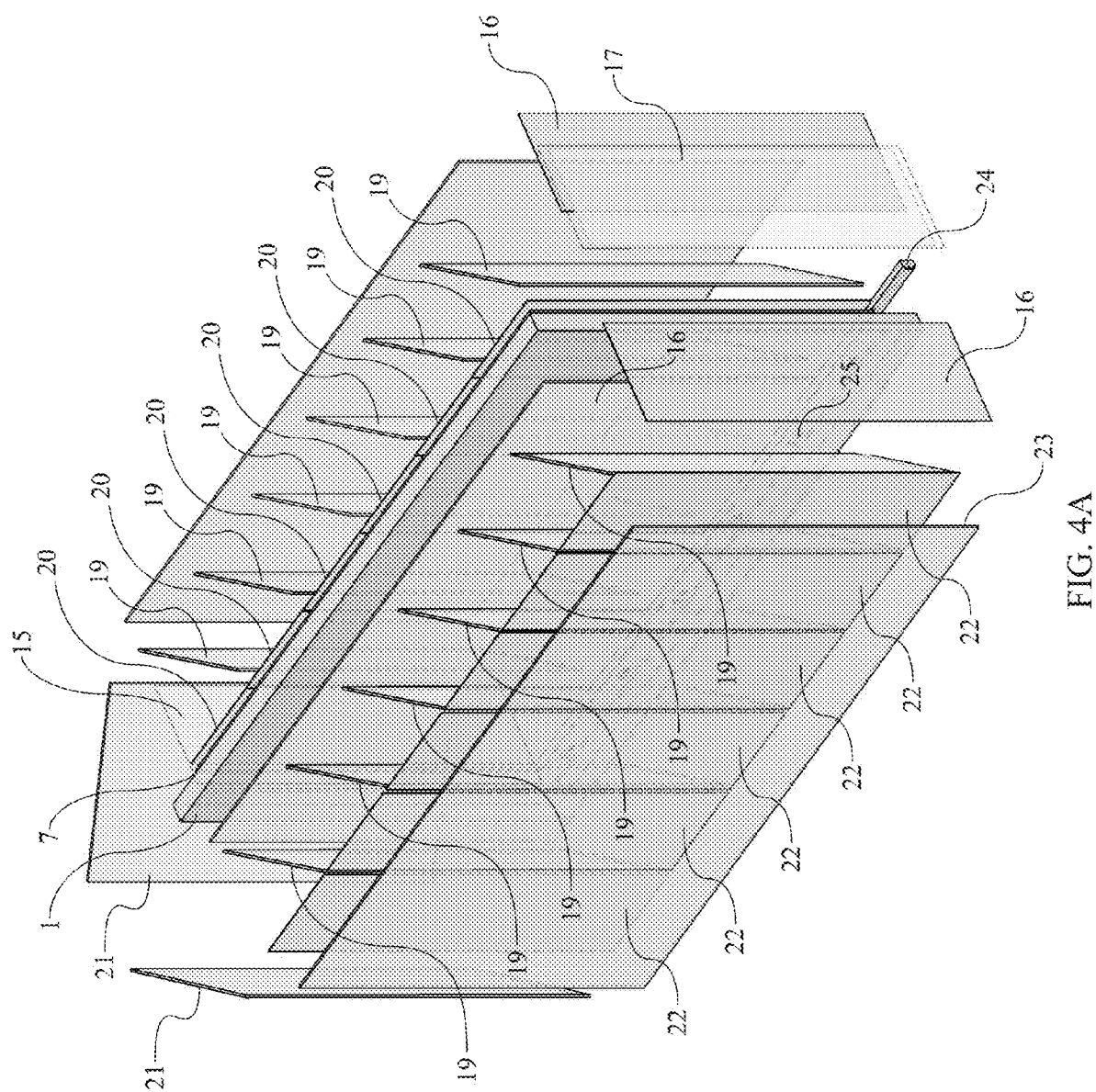
FIG. 4A illustrates a perspective view of the exploded 3D model of the embodiment in FIG. 1C which is a lightfield display with active time multiplexed aperture extension with an FEC with perpendicular emission and folded aperture.

FIG. 4A illustrates a perspective view of the exploded 3D model of the embodiment in FIG. 1C, which is a lightfield display with active time-multiplexed aperture extension with an FEC with perpendicular emission and folded aperture. In this embodiment, the light is generated at an emissive display 1, which is sandwiched inside the present invention and is facing backward away from aperture 4. The light then passes through the angular profiling layer 7 such as a privacy film, and the light then passes through an active or passive polarization-impacting layer 20 at a desired enter gate from the plurality of enter gates 3. The active or passive polarization-impacting layer 20 can be, but is not limited to, a waveplate, a liquid crystal, or an absorptive polarizer that is used to set the polarization as desired at each enter gate 3. The light then is reflected from a desired input reflector from a plurality of switchable electro-optical (EO) reflectors 19 and is guided toward the reflective relay 6. In this embodiment, the reflective relay 6 is a pair of mirrors 21 that are positioned at a 90-degree horizontal angle with each other. The light is then fed into the aperture 4 and passes through several output EO reflectors from the plurality of EO reflectors 19 that are in transparent mode (i.e., OFF). The light is then reflected at the desired exit gate that has an output EO reflector from the plurality of EO reflectors 19 that is in reflective mode (i.e., ON). The light then passes through an active polarization-impacting layer 22 such as liquid crystal and then passes through an absorptive polarizer layer 23. The active polarization-impacting layer 22 and the absorptive polarizer layer 23 are stacked onto each other in order to create an electro-optical shutter and are controllable at each exit gate 5 of the aperture 4 in order to prevent unwanted reflection from the output EO reflectors in transparent mode to leak out of the aperture 4. A control circuit 24 is used to control each switchable EO reflector 19, and a plurality of syncing sensors 25 is used to read or sense a signal light from a small subset of pixels in the emissive display 1, which allows the control circuit 24 to know which enter gate 3 should open and close at what time.

Figure 4B:
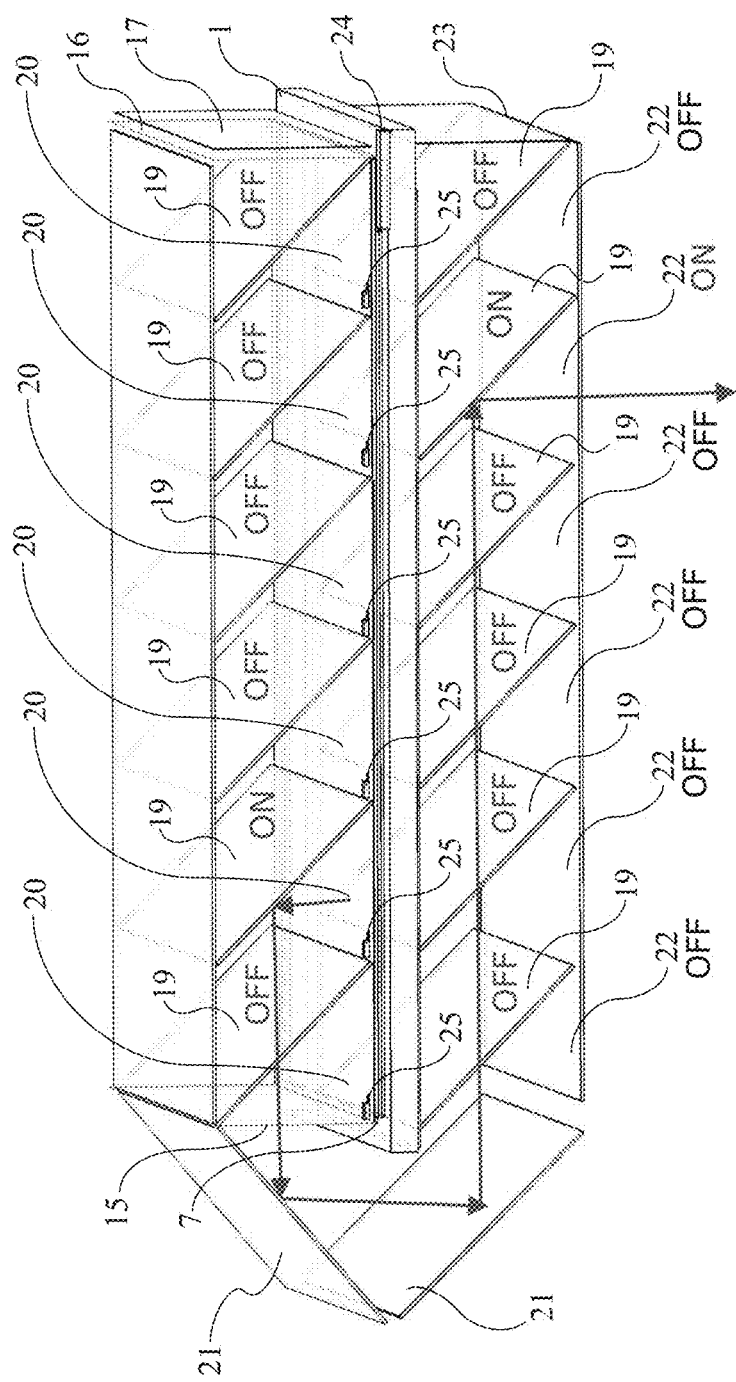
FIG. 4B illustrates a side view of the embodiment in FIG. 1C and the light paths inside the system for one aperture exit gate and one cavity enter gate. This figure depicts a lightfield display with active time multiplexed aperture extension with an FEC with perpendicular emission and folded aperture.

FIG. 4B illustrates a side view of the embodiment in FIG. 1C, and the light paths inside the system from and one cavity enter gate to one aperture exit gate, which is a lightfield display with active time-multiplexed aperture extension with an FEC with perpendicular emission and folded aperture. In this embodiment, the aperture 4 is shaped to fold back on the side of the FEC 2. FIG. 4B shows the example of what happens at one instance of time during the operation for this embodiment. The following explanation describes how this embodiment is used for one cycle and describes how this embodiment can be programmed to show a certain depth. This embodiment has six enter gates 3 and six exit gates 5, which are multiplied by each other to have 36 different combinations of depth and location that the depth is shown. However, it is preferred that at each depth that the full aperture of the display is used and not only one gate. Therefore, this embodiment goes through two periodic cycles: one cycle at the exit gates 5 of the aperture 4; and one cycle at the enter gates 3 of the FEC 2 to guide the light to different depths at a given time. The light that travels to the furthest exit gate at the right side of aperture 4 must travel the shortest distance in the FEC 2. Thus, the distance traveled by the light in aperture 4 and the FEC 2 added together is always the same, which results in the equal depth of the image for all gates in one period. In this embodiment, the plurality of enter gates 3 and the plurality of exit gates 5 are both active; the plurality of exit gates 5 opens one at the time, and at that time, the plurality of enter gates 3 is sequentially opened (i.e., the EO reflectors are in reflective mode or "ON"). Thereafter, the current exit gate from the plurality of exit gates 5 is closed, a subsequent exit gate from the plurality of exit gates 5 opens, the plurality of enter gates 3 is again sequentially opened, and so on. Thus, if this embodiment has six enter gates 3 and six exit gates 5, then this embodiment facilitates 36 switching actions or switching commands that happens in one full period of the system. Consequently, such systems are referred to as time multiplexed. In some embodiments, the entire FEC 2 is passive so that the six depth simultaneously exit one aperture. Therefore, the plurality of exit gates 5 is sequentially opened and closed in a periodic manner, one at a time, either from left to right or from right to left, which is notably faster (i.e., at least 36 times faster in this case) than the frame rate of the emissive display 1. The maximum number of depth layers that can be shown is usually equal to the number of enter gates multiplied by number of exit gates. Thus, an increase in the depth fidelity (number of layers in depth) requires an increase in the number of enter gates and exit gates.

Figure 5A:
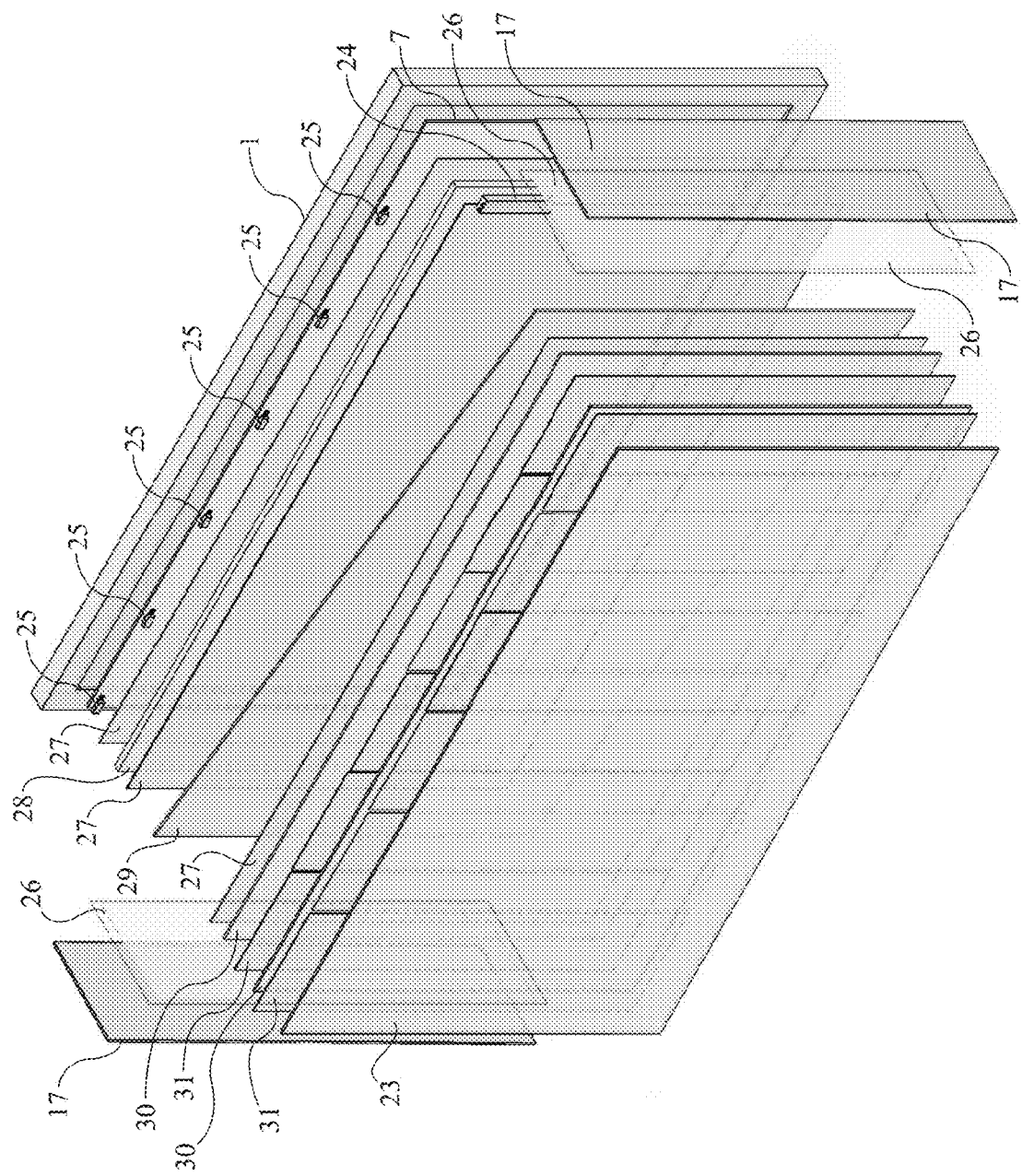
FIG. 5A illustrates a perspective view of the exploded 3D model of the embodiment in FIG. 1D which is a lightfield display with active time multiplexed aperture extension with a coaxial FEC also referred to as the "N" engine.

FIG. 5A depicts a perspective view of the exploded 3D model of the embodiment in FIG. 1D, which is a lightfield display with active time-multiplexed aperture extension with a coaxial FEC also referred to as the "N" engine. In this embodiment, the light is generated at an emissive display 1, which is at the back and further away from the aperture 4. The light then passes through the angular profiling layer 7 such as privacy film, and the light then passes through a first layer from a pair of active or passive polarization impacting layers 27 at a desired enter gate from the plurality of enter gates 3, wherein the first layer can be, but is not limited to, a quarter waveplate or a variable polarization retarding film. The light then passes through a beam splitting layer 28 and then passes through a second layer from the pair of active or passive polarization impacting layers 27, wherein the second layer can be, but not limited to, another quarter waveplate. Such an arrangement of components is referred to as "QBQ" in the present disclosure and is used to flip the polarization of the light by 90 degrees wherever the light reflects from the arrangement or pass through the arrangement. For example, if a piece of light with horizontal polarization passes through a QBQ or reflects from a QBQ, the piece of light will be converted to vertical polarization. The light then passes or reflects from a tilted intra-cavity layer 29, which can be, but is not limited to, a reflective polarizer (e.g., a wire grid polarizer), depending on the polarization type of the light. The light then circulates multiple times inside the FEC 2 depending on a desired exit gate from the plurality of exit gates 5. For each round trip of FEC 2, the chief ray of light slightly travels in a translational direction (i.e., in this case, horizontal) and keeps reaching a new gate, until the desired exit gate from the plurality of exit gates 5 is in the transmission mode (i.e., the desired exit gate is open), and the light is consequently able to exit the aperture 4. The desired exit gate can be, but is not limited to, a switchable black mirror with quarter waveplate (SBMQ) or a full switchable mirror. In this embodiment, the SBMQ is sequentially composed of the second layer from the pair of active or passive polarization-impacting layers 27 (e.g., a quarter waveplate), a first polarizer from a pair of wiregrid polarizers 30, a first layer from a pair of liquid crystal active layers 31, a second polarizer from the pair of wiregrid polarizers 30 (i.e., the first polarizer and the second polarizer are cross polarized to each other), a second layer from the pair of liquid crystal active layers 31, and the absorptive polarizer layer 23 (i.e., to block leakage and block ambient reflection). A stack of quarter waveplate 26 on a mirror (QM) at the sides of the FEC 2 is used to change the polarization of the light in 90 degrees up on incident. The plurality of cover walls 17 is used to mechanically support the optical components and keep them in place while blocking the ambient light from getting into the FEC 2. A control circuit 24 is used to control each switchable EO reflector 19, and a plurality of syncing sensors 25 is used to read or sense a signal light from a small subset of pixels in the emissive display 1, which allows the control circuit 24 to know which enter gate 3 should open and close at what time. Basically, the video signal that is shown on the emissive display 1 controls the gates based on these codes that are shown to the plurality of syncing sensors 25.

Figure 5B:
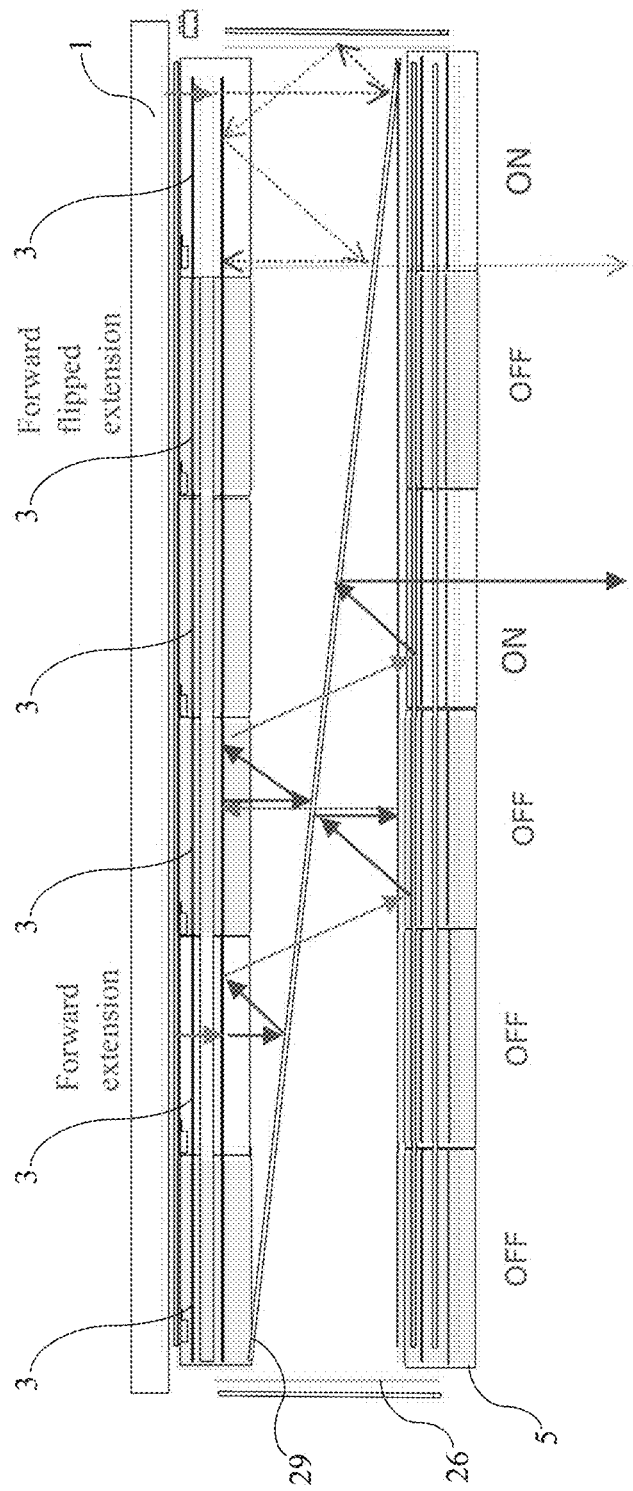
FIG. 5B illustrates a side view of the embodiment in FIG. 1D and the light paths inside the system for forward extension and forward flipped extension which is a lightfield display with active time multiplexed aperture extension with a coaxial FEC also referred to as the "N" engine.

FIG. 5B depicts a side view of the embodiment in FIG. 1D, and the light paths inside the "N" engine for "forward extension" and "forward flipped extension". In the forward extension, the polarization of the light is set in such a way that the light is initially reflected off the tilted intra-cavity layer 29, before the light passes through the tilted intra-cavity layer 29, so that the light is initially crossed polarized by the tilted intra-cavity layer 29. As soon as the light enters the FEC 2 through the desired enter gate from the plurality of enter gates 3, the light reflects off the tilted intra-cavity layer 29 and goes back towards the QBQ. Moreover, the QBQ changes the polarization of the light by 90 degrees and feeds the light back towards the tilted intra-cavity layer 29, which preserves the angle of the chief ray. The light then passes through the tilted intra-cavity layer 29 and hits the desired exit gate from the plurality of exit gates 5 while making some translation along some other gates due to its angle. If an exit gate which is a SBMQ in this embodiment is set in reflective mode, the light will reflect back with its polarization rotated by another 90 degrees. Thus, the light again reflects off the tilted intra-cavity layer 29, but this time with chief ray angle is coaxial with the surface normal vector of the emissive display 1 (i.e., axis normal or orthogonal to an output surface of the emissive display 1). This description is of one cycle or roundtrip of the light inside the FEC 2 of the N engine. The light may be forced to go through several roundtrips, until the light reaches a desired exit gate from the plurality of exit gates 5, wherein the desired exit gate is in transmission mode and causes the light to exit through the aperture 4. If the light due to horizontal transition hits the side QM, the light will then reflect back towards the FEC 2 with a flipped angle, and the light will keep cycling inside the FEC 2 to reach the desired exit gate which is set in transmission mode. This is referred to as forward flipped extension process.

Figure 5C:
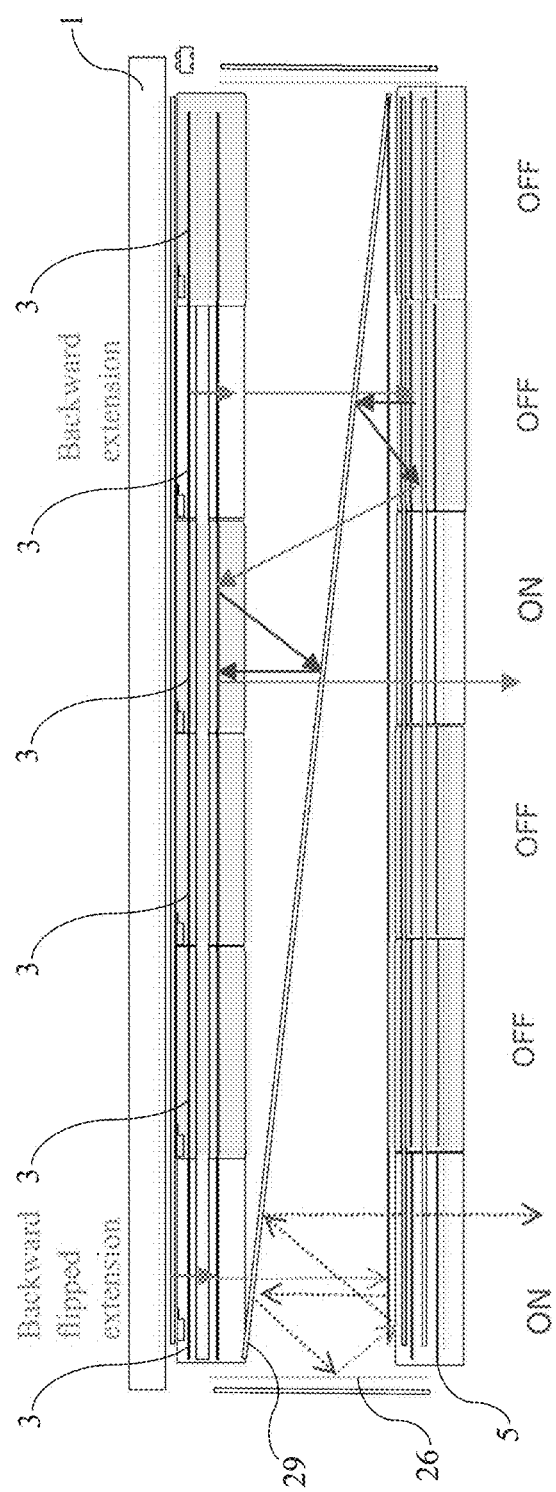
FIG. 5C illustrates a side view of the embodiment in FIG. 1D and the light paths inside the system for backward extension and backward flipped extension for the system which is a lightfield display with active time multiplexed aperture extension with a coaxial FEC also referred to as the "N" engine.

FIG. 5C depicts a side view of the embodiment in FIG. 1D, and the light paths inside the "N" engine for "backward extension" and "backward flipped extension". In the backward extension, the polarization of the light is set in such a way that the light is initially passes through the tilted intra-cavity layer 29 before the light reflects of the tilted intra-cavity layer 29, so that the polarization of the light is aligned with the pass angle of the tilted intra-cavity layer 29 in the middle of FEC 2. As soon as the light enters the FEC 2 through the desired enter gate from the plurality of enter gates 3, the light passes through the tilted intra-cavity layer 29 and hits the layers of SBMQ for the desired exit gate from the plurality of exit gates 5. If the SBMQ is set in transmission mode, the light would simply exit the aperture 4 to the outside world. However, if SBMQ is set in reflective mode, the SBMQ then changes the polarization of the light by 90 degrees and then reflects the light back towards the tilted intra-cavity layer 29, which preserves the angle of the chief ray that is coaxial with the surface normal vector of the emissive display 1. The light is then reflected from the tilted intra-cavity layer 29 with an angle and again hits the desired exit gate from the plurality of exit gates 5, but this time with an angle due to the tilt of the tilted intra-cavity layer 29. If the SBMQ is set in reflective mode, the light will again reflect this time, which preserves the angle and applies another 90-degree rotation in polarization. At this time, the polarization of the light is aligned with the pass angle of the tilted intra-cavity layer 29, and the light consequently passes through the tilted intra-cavity layer 29. The light then goes back and hits the QBQ on the emissive display 1, which again rotates the polarization of the light by 90 degrees while preserving the angle. Thus, the light is again cross polarized with the tilted intra-cavity layer 29, which allows the light to be reflected by the tilted intra-cavity layer 29 and consequently allows the light to again be coaxial with the surface normal vector of the emissive display 1. This description is of one cycle or roundtrip of the light inside the FEC 2 of the N engine in backward extension mode. The light might be forced to go through several roundtrips, until the light reaches a desired exit gate from the plurality of exit gates 5, wherein the desired exit gate is in transmission mode and causes the light to exit through the aperture 4. If the light due to horizontal transition hits the side QM on the left, the light will then reflect back towards the FEC 2 with a flipped angle, and the light will keep cycling inside the FEC 2 to reach the desired exit gate which is set in transmission mode. This is referred to backward flipped extension process. As the light goes through more round trips, the deeper that the image will appear. The timing of the plurality of enter gates 3 and the plurality of exit gates 5 depends on how much depth that is desired to be shown, how much light is desired to be shown, and how many gates there are.

Figure 6A:
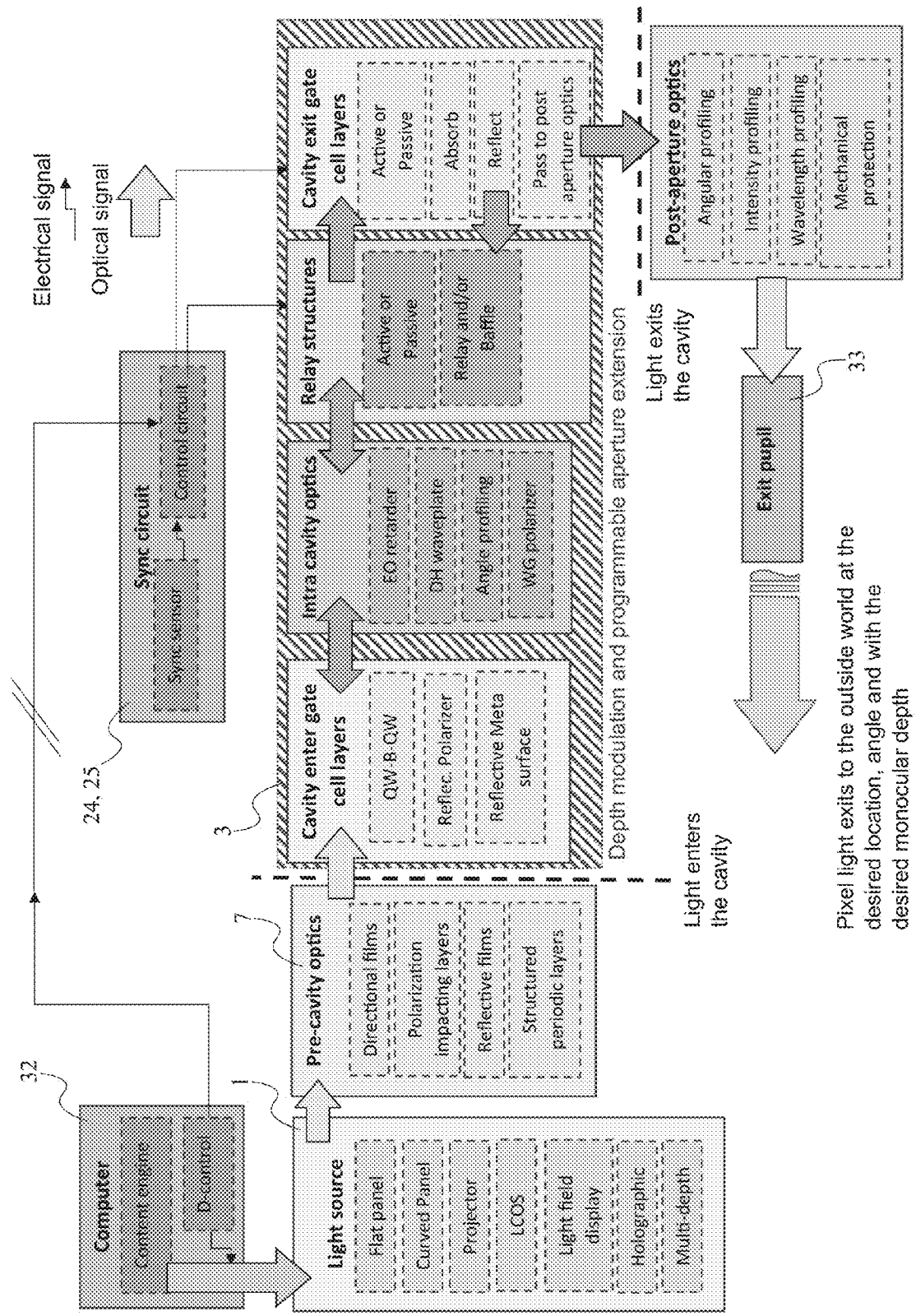
FIG. 6A is a block diagram illustrating example components of a display system for modulating depth and extending the aperture, in accordance with implementations of the present disclosure.

FIG. 6A is a block diagram depicting the common components of a display system for modulating depth and extending the aperture, in accordance with implementations of the present disclosure. While the geometry of the different embodiments can be arbitrarily engineered, the block diagram in FIG. 6A indicates the preferred set of components that make up the display system. An electrical signal is sent by a computer 32 to an emissive display 1, which is shown in FIG. 6A as the light source. The light from the emissive display 1 then goes through a set of pre-cavity optics such as directional films (e.g., privacy film or prismatic film) or any film that change the angular profile of the light. The pre-cavity optics may be used to impact the polarization of the light, impact the wavelength of the light, or impact the light in any arbitrary manner in preparation for the FEC 2. The light then enters the depth modulator, which is the FEC 2. The FEC 2 has a plurality of enter gates 3, which initially receive the light as can be seen in the different embodiments described in FIGS. 1A, 1B, 1C, and 1D. The plurality of enter gates 3 is used to control where the light from whichever section of the emissive display 1 should enter the FEC 2, and the plurality of enter gates 3 works in synchronization with the plurality of exit gates 5 in order to provide the desired depth and aperture extension. Each enter gate 3 is either signaled directly by the computer 32 or optically signaled by the image that is shown on the emissive display 1, which can be referred to as optical syncing. The plurality of enter gates 3 can be, but is not limited to, QBQ, reflective wiregrid, or switchable mirrors. The intra-cavity optics is a set of optical components that process the light and decides how the light is reflected or guided depending on its polarization, its angle, or its wavelength. An example of intra-cavity optics is the tilted intra-cavity layer 29 in the "N" engine. In some embodiments, the light then has to pass through at least one optical relay mechanism to get to the plurality of exit gates 5, wherein an optical relay mechanism can be used to guide light in the right angle or can be used to eliminate the unwanted light (e.g., the transmissive baffle layer 15) that is leaking from the FEC 2. The light then reaches a first set of functional layers that the light must pass through in order to exit the FEC 2. In some embodiments, the first set of functional layers is stacked onto a second set of functional layers that the light must pass through in order to exit the aperture 4 (e.g., the embodiment shown in FIG. 1D). In some other embodiments, the first set of functional layers is not stacked onto the second set of functional layers (e.g., the embodiment shown in FIG. 1B). The optical code that is shown on some subset of pixels to control the plurality of exit gates 5 is read by the plurality of syncing sensors 25, which is communicably coupled to a control circuit 24. This signal can be overwritten or controlled by the computer 32 to further impact the relay structure or the plurality of exit gates 5. Depth control is referred to as "D-control" in FIG. 6A, and the content engine is used to generate or render content in the computer 32. The light then passes through a post aperture optics, which is used to modify the angle, the polarization, the intensity, or the wavelength of the light. The light then passes through an exit pupil 33, which is an imaginary surface. Thus, the light that passes through the exit pupil 33 is put into the world and shows the pixels at the desired depth and location.

Figure 6B:
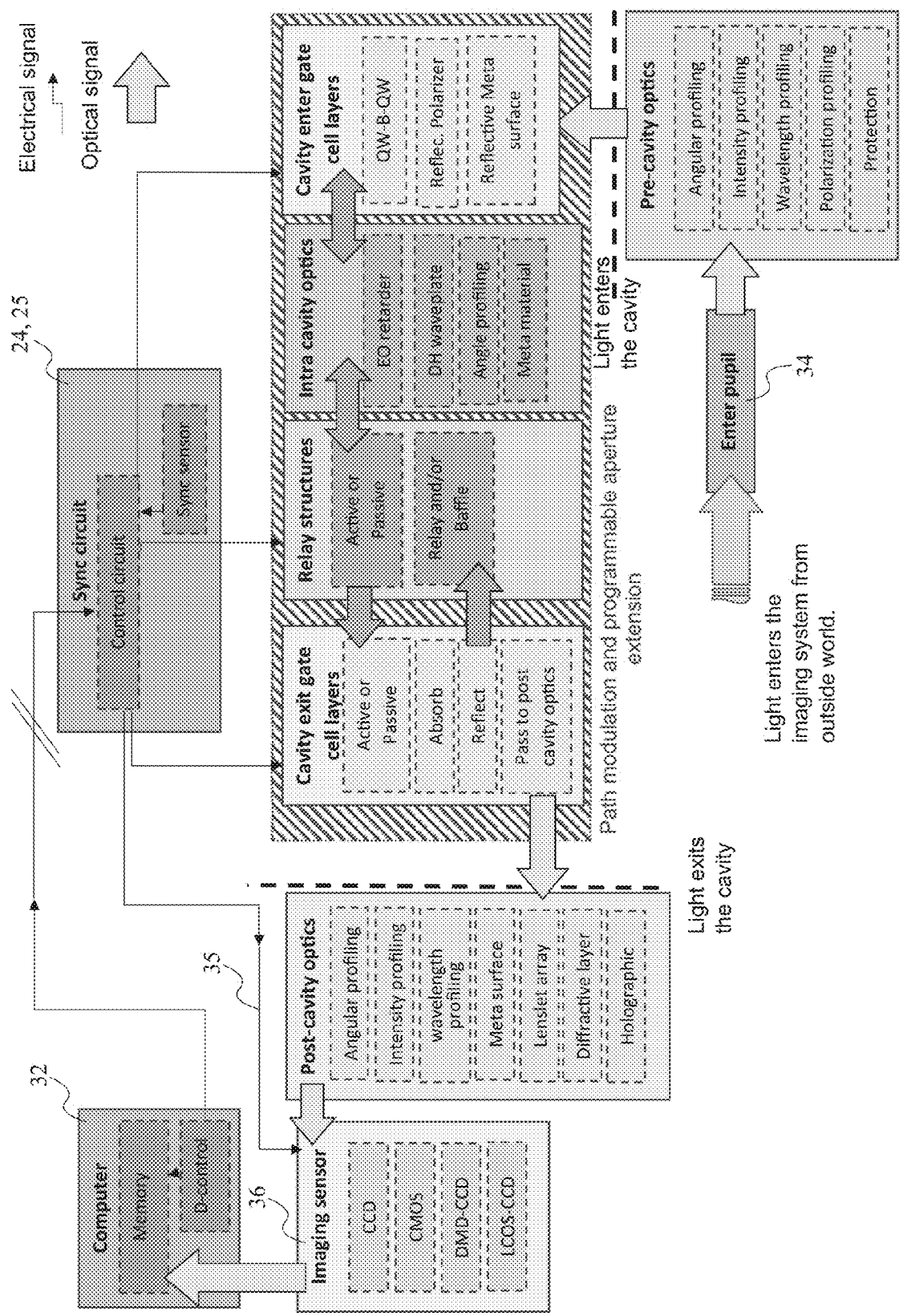
FIG. 6B is a block diagram illustrating example components of an imaging system for modulating optical path and extending the aperture, in accordance with implementations of the present disclosure.

FIG. 6B is a block diagram illustrating example components of an imaging system for modulating optical path and extending the aperture, in accordance with implementations of the present disclosure. FIG. 6B is a block diagram depicting the common components of an imaging system for modulating or manipulating path of light and extending the aperture, in accordance with implementations of the present disclosure. While the geometry of the different embodiments can be arbitrarily engineered, the block diagram in FIG. 6B indicates the preferred set of components that make up the imaging system. An electrical signal is sent by a depth control software (i.e., a software managing the "D-control") being executed by the computer 32 to the control circuit 24, which electronically controls the plurality of enter gates 3, the plurality of exit gates 5, and the imaging sensor 36 of the imaging system. In the imaging system, the light travels in the opposite direction in comparison to the display system. Thus, the light initially enters the imaging system through an entrance pupil 34. The light then goes through a set of pre-cavity optics such as lens groups, a set of imaging lenses, directional films (e.g., privacy film or prismatic film), or any film that change the angular profile of the light. The pre-cavity optics may be used to impact the polarization of the light, impact the wavelength of the light, or impact the light in any arbitrary manner in preparation for the FEC 2. The FEC 2 is functionally similar in both the imaging system and the display system, except the light enters the aperture 4 of the imaging system. Consequently, the light enters the FEC 2 of the imaging system from the world not from a display. The imaging aperture includes the plurality of enter gates 3, which initially receives the light and is used to control where the light from whichever section of the imaging aperture should enter the FEC 2. In addition, the plurality of enter gates 3 works in synchronization with the plurality of exit gates 5 in order to provide the desired depth and aperture extension. Each enter gate 3 is either signaled directly by the computer 32 or optically signaled by the image light coming from the outside world, which can be referred to as optical syncing. The plurality of enter gates 3 can be, but is not limited to, QBQ, reflective wiregrid, or switchable mirrors. The intra-cavity optics is a set of optical components that process the light and decides how the light is reflected or guided depending on its polarization, the length of its travel path, its angle, or its wavelength. An example of intra-cavity optics is a wiregrid or a nonlinear crystal. In some embodiments, the light then has to pass through at least one optical relay mechanism to get to the plurality of exit gates 5, wherein an optical relay mechanism can be used to guide light in the right angle or can be used to eliminate the unwanted light (e.g., the transmissive baffle layer 15) that is leaking from the FEC 2. The optical relay mechanism can be active or passive. The light then reaches a set of functional layers that the light must pass through in order to exit the FEC 2. In some embodiments, the set of functional layers is stacked onto the imaging sensor 36. Also, in some embodiments, a set of post-cavity optics 35 may include additional lens groups. The light then forms an image on the imaging sensor 36 which is recorded by the computer 32.

As the present disclosure continues to describe numerous other architectures, it is helpful to explain some of these gate layers in more details. The present invention may include several sets of layers that can act as switchable mirrors or a reflector with polarization impact.

Figure 7A:
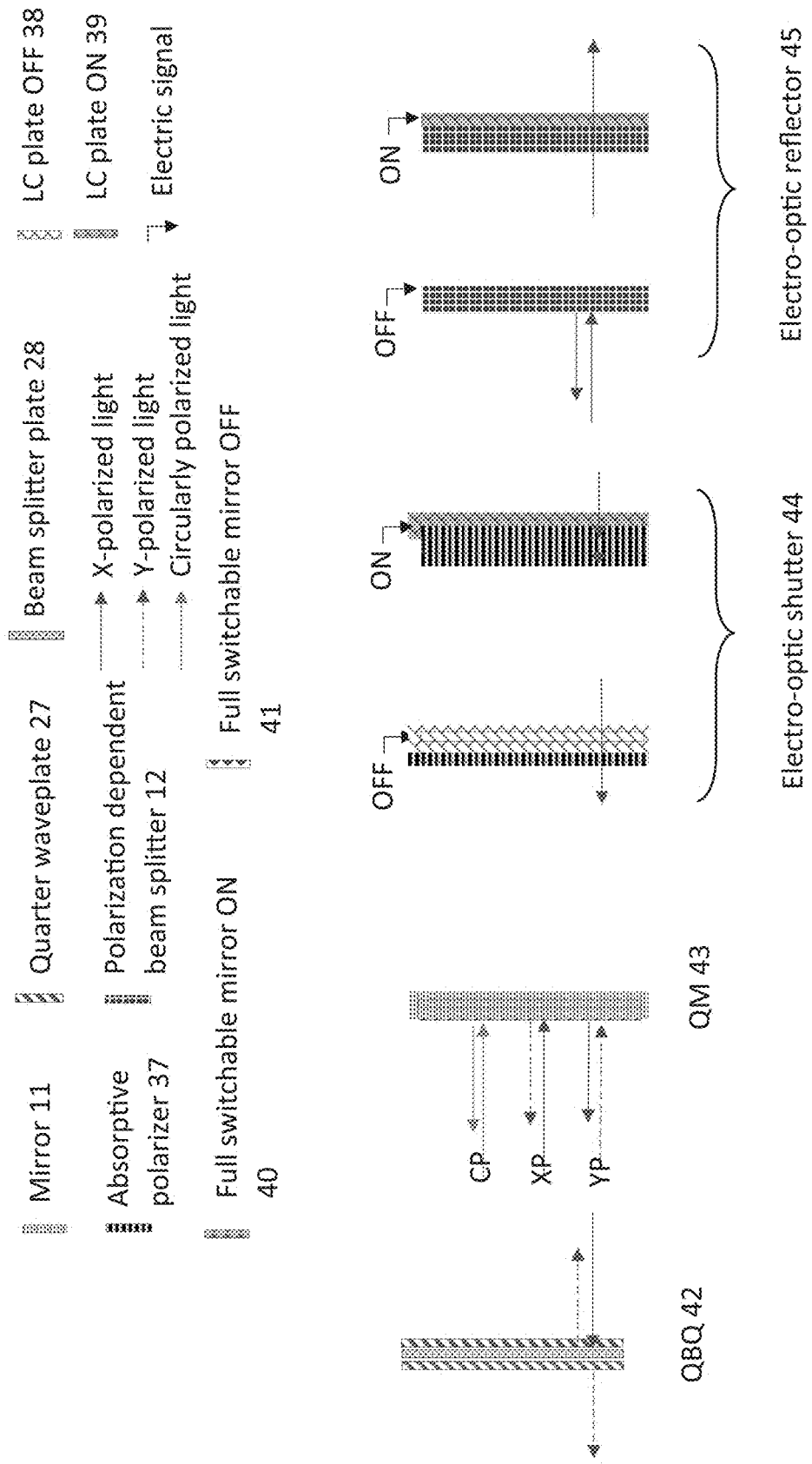
FIG. 7A illustrates a schematic diagram of layers stacked together as quarter waveplate-beam splitter quarter waveplate (QBQ), quarter waveplate-mirror (QM), electro-optic shutter (EO-shutter), and electro-optic reflector (EO-reflector).
Figure 7B:
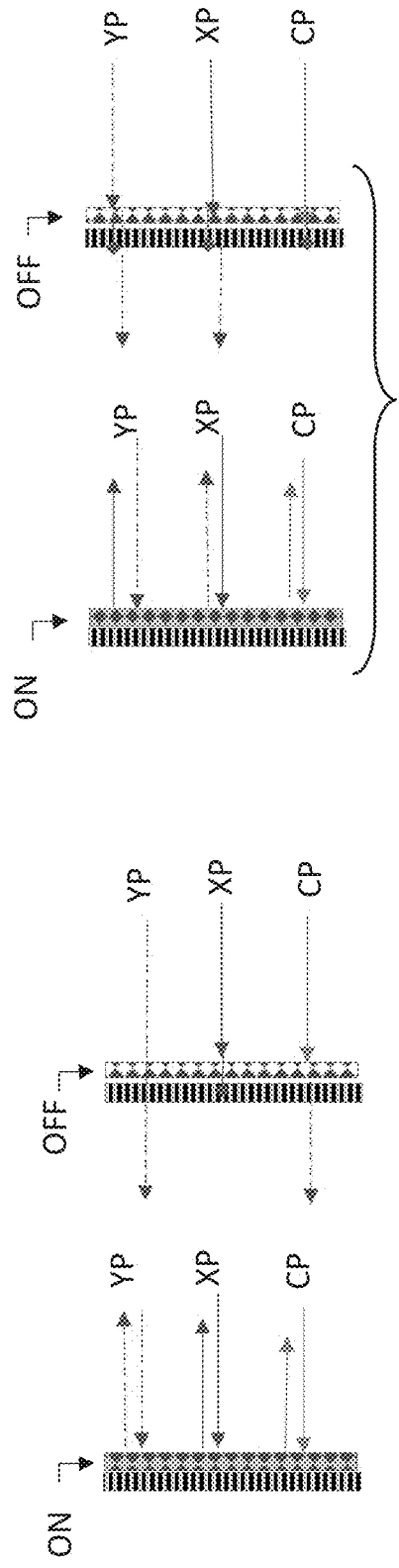
FIG. 7B illustrates a schematic diagram of layers stacked together as full switchable black mirror (FSBM) and full switchable black mirror with quarter waveplate (FSBMQ).
Figure 7C:
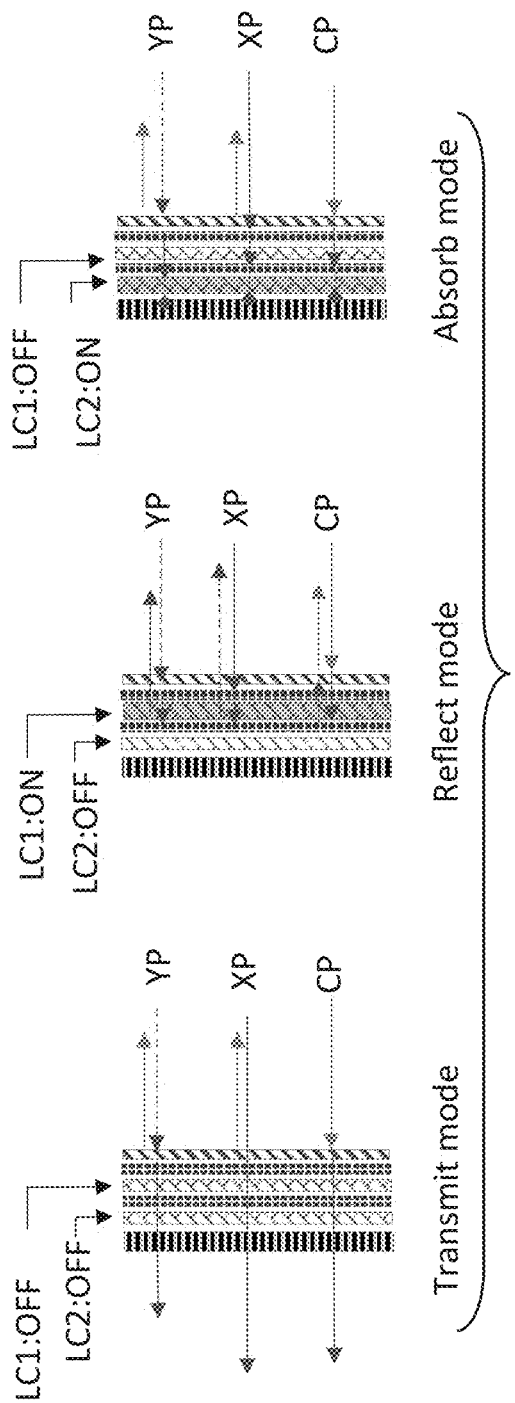
FIG. 7C illustrates a schematic diagram of layers stacked together as switchable black mirror with quarter waveplate (SBMQ).

FIGS. 7A, 7B, and 7C illustrates a schematic diagram of layers stacked together as quarter waveplate-beam splitter-quarter waveplate (QBQ), quarter waveplate-mirror (QM), electro-optic shutter (EO-shutter), electro-optic reflector (EO-reflector), full switchable black mirror (FSBM), full switchable black mirror with quarter waveplate (FSBMQ), switchable black mirror with quarter waveplate (SBMQ). The functionality of each of these layer stacks can be explained with a matrix referred to as a layer matrix, which is shown as Equation 1:

$$\text{Layer matrix} = \begin{bmatrix} \text{Inc} & R & T & A \\ X & & & \\ Y & & & \\ RCP & & & \\ LCP & & & \end{bmatrix}; \quad \text{Eq. 1}$$

The layer matrix has four columns and four rows. The first column is always the same and refers to the polarization status of the incident light. Incident light is the light that is entering the system or is incident on the layers. At the first column from the left and from the top to the bottom: The first row refers to X polarization (horizontally and linearly polarized); the second row relates to Y polarization (vertically and linearly polarized); the third row relates to right-handed (clockwise) circularly polarization; and the last row refers to left-handed (counter-clockwise) circularly polarization. The second column refers to reflection of the incident light from the system at the polarizations given in the incident column. The third column refers to transmission of the incident light through the system at the polarizations given in the incident column. The fourth column refers to absorption of the incident light through the system at the polarizations given in the incident column.

The QBQ stack 42 is a layer combination of Quarter waveplate-Beam splitter-Quarter waveplate. The QBQ stack 42 relates to the layer matrix shown as Equation 2:

$$QBQ = \begin{bmatrix} X & Y & Y & 0 \\ Y & X & X & 0 \\ RCP & RCP & RCP & 0 \\ LCP & LCP & LCP & 0 \end{bmatrix}; \quad \text{Eq. 2}$$

The QM stack 43 is a layer combination of Quarter waveplate-Mirror and impacts the polarization of the light. The QM stack 43 relates to the layer matrix shown as Equation 3:

$$QM = \begin{bmatrix} X & Y & 0 & 0 \\ Y & X & 0 & 0 \\ RCP & RCP & 0 & 0 \\ LCP & LCP & 0 & 0 \end{bmatrix}; \quad \text{Eq. 3}$$

The EO-shutter 44 is a layer combination of an electro-optical shutter and impacts the polarization and intensity of the light. The EO-shutter 44 relates to two layer matrices shown as Equation 4, wherein one layer matrix is for the "OFF" status, and wherein one layer matrix for the "ON" status:

$$EO \text{ shutter OFF} = \begin{bmatrix} X & 0X0 \\ Y & 00Y \\ RCP & 0XY \\ LCP & 0XY \end{bmatrix}; \quad EO \text{ shutter ON} = \begin{bmatrix} X & 00Y \\ Y & 0X0 \\ RCP & 0XY \\ LCP & 0XY \end{bmatrix}; \quad \text{Eq. 4}$$

Moreover, the EO-shutter 44 is either used to allow the light with a desired polarization to pass through when the EO-shutter 44 is in the "ON" status or used to absorb the light when the EO-shutter 44 is in the "OFF" status.

The EO-reflector 45 is a layer combination of an electro-optical reflector and impacts the polarization and intensity of the light. The EO-reflector 45 relates to two layer matrices shown as Equation 5, wherein one layer matrix is for the "OFF" status, and wherein one layer matrix for the "ON" status:

$$EO \text{ reflector OFF} = \begin{bmatrix} X & X00 \\ Y & 0Y0 \\ RCP & XY0 \\ LCP & XY0 \end{bmatrix}; \quad \text{Eq. 5}$$

$$EO \text{ reflector ON} = \begin{bmatrix} X & 0X0 \\ Y & Y00 \\ RCP & YX0 \\ LCP & YX0 \end{bmatrix};$$

Moreover, the EO-reflector 45 is either used to reflect the light with a desired polarization when the EO-reflector 45 in the "ON" status or used to allow the light to pass through when the EO-reflector 45 is in the "OFF" status. The EO-reflector 45 is preferably used in the plurality of enter gates 3 for the embodiment shown in FIG. 1C. The EO-reflector 45 can be used as a mirror or as a piece of transparent glass, but the EO-reflector 45 can only do that for one specific polarization of light.

The FSBM stack 46 is a layer combination of full switchable black mirror and impacts the polarization and intensity of the light. The FSBM stack 46 relates to two layer matrices shown as Equation 6, wherein one layer matrix is for the "OFF" status, and wherein one layer matrix for the "ON" status:

$$FSBM \text{ OFF} = \begin{bmatrix} X & 0X0 \\ Y & 00Y \\ RCP & 0XY \\ LCP & 0XY \end{bmatrix}; \quad FSBM \text{ ON} = \begin{bmatrix} X & X & 0 & 0 \\ Y & Y & 0 & 0 \\ RCP & LCP & 0 & 0 \\ LCP & RCP & 0 & 0 \end{bmatrix}; \quad \text{Eq. 6}$$

The FSBM stack 46 is used to reflect any polarization of the light similar to a normal passive silver mirror. However, when the FSBM stack 46 is in the "ON" status, the FSBM stack 46 is fully transparent and absorbs one of the polarizations. Moreover, the FSBM stack 46 is referred to as black mirror because the FSBM stack 46 becomes black or absorptive to that polarization when the FSBM stack 46 is in the "OFF" status. Such mirrors are more sophisticated to be realized; one example embodiment of such mirror is a metal-hydride switchable mirrors that has an absorptive polarizer at the back side (the side that is on the opposite side of the incident beam).

The FSBMQ stack 47 is a layer combination of full switchable black mirror with quarter waveplate and impacts the polarization and intensity of the light. The FSBMQ stack 47 is similar to the FSBM stack 46, but the FSBMQ stack 47 has a quarter waveplate on the reflective side, which changes the polarization of the light upon reflection or transmission. The FSBMQ stack 47 relates to two layer matrices shown as Equation 7, wherein one layer matrix is for the "OFF" status, and wherein one layer matrix for the "ON" status:

$$FSBMQ \text{ OFF} = \begin{bmatrix} X & 0 & X & Y \\ Y & 0 & X & Y \\ RCP & 0 & 0 & Y \\ LCP & 0 & X & 0 \end{bmatrix};$$

Eq. 7

$$FSBMQ \text{ ON} = \begin{bmatrix} X & Y & 0 & 0 \\ Y & X & 0 & 0 \\ RCP & RCP & 0 & 0 \\ LCP & LCP & 0 & 0 \end{bmatrix};$$

The SBMQ stack 48 is a layer combination of switchable black mirror with quarter waveplate and impacts the polarization and intensity of the light. The SBMQ stack 48 is a more sophisticated stack of layers because the SBMQ stack 48 allows for three different ways to impact the light. Moreover, the SBMQ stack 48 in transit mode appears transparent to the light with a specific polarization. The SBMQ stack 48 in reflect mode fully reflects the incident light with a specific polarization and impacts the polarization by 90 degrees. The SBMQ stack 48 in absorb mode fully or partially absorbs the light with a specific polarization. The FSBMQ stack 47 relates to three layer matrices shown as Equation 8, wherein one layer matrix is for the "transmit mode" status, and wherein one layer matrix for the "reflect mode" status, and wherein one layer matrix for the "absorb mode" status:

$$SBMQ \text{ Transmit mode} = \begin{bmatrix} X & RCP & X & 0 \\ Y & 0 & 0 & Y \\ RCP & 0 & X & Y \\ LCP & 0 & X & Y \end{bmatrix};$$

$$SBMQ \text{ Reflect } Mdode = \begin{bmatrix} X & X & 0 & 0 \\ Y & Y & 0 & 0 \\ RCP & LCP & 0 & 0 \\ LCP & RCP & 0 & 0 \end{bmatrix};$$

Eq. 8

$$SBMQ \text{ Absorb mode} = \begin{bmatrix} X & LCP & 0 & Y \\ Y & RCP & 0 & Y \\ RCP & 0 & 0 & Y \\ LCP & LCP & 0 & 0 \end{bmatrix};$$

The SBMQ stack 48 is used in more advanced designs as an exit gate and has two layers of liquid crystals. In addition, the performance of the SBMQ stack 48 is not ideal because the SBMQ stack 48 does not transmit, reflect, and absorb in all polarizations. Three layer matrices for an ideal SBMQ stack are shown in Equation 9. Such ideal cases can be made by using electrochromic materials stacked onto metal-hydride switchable mirrors; both of such active materials may be too slow for faster frame rate applications.

$$\text{Ideal transmit mode} = \begin{bmatrix} X & X & 0 & 0 \\ Y & Y & 0 & 0 \\ RCP & RCP & 0 & 0 \\ LCP & RCP & 0 & 0 \end{bmatrix};$$

Eq.9

$$\text{Ideal reflect } Mdode = \begin{bmatrix} X & 0 & X & 0 \\ Y & 0 & Y & 0 \\ RCP & 0 & LCP & 0 \\ LCP & 0 & RCP & 0 \end{bmatrix};$$

$$\text{Ideal absorb mode} = \begin{bmatrix} X & 0 & 0 & X \\ Y & 0 & 0 & Y \\ RCP & 0 & 0 & RCP \\ LCP & 0 & 0 & LCP \end{bmatrix};$$

Figure 8A:
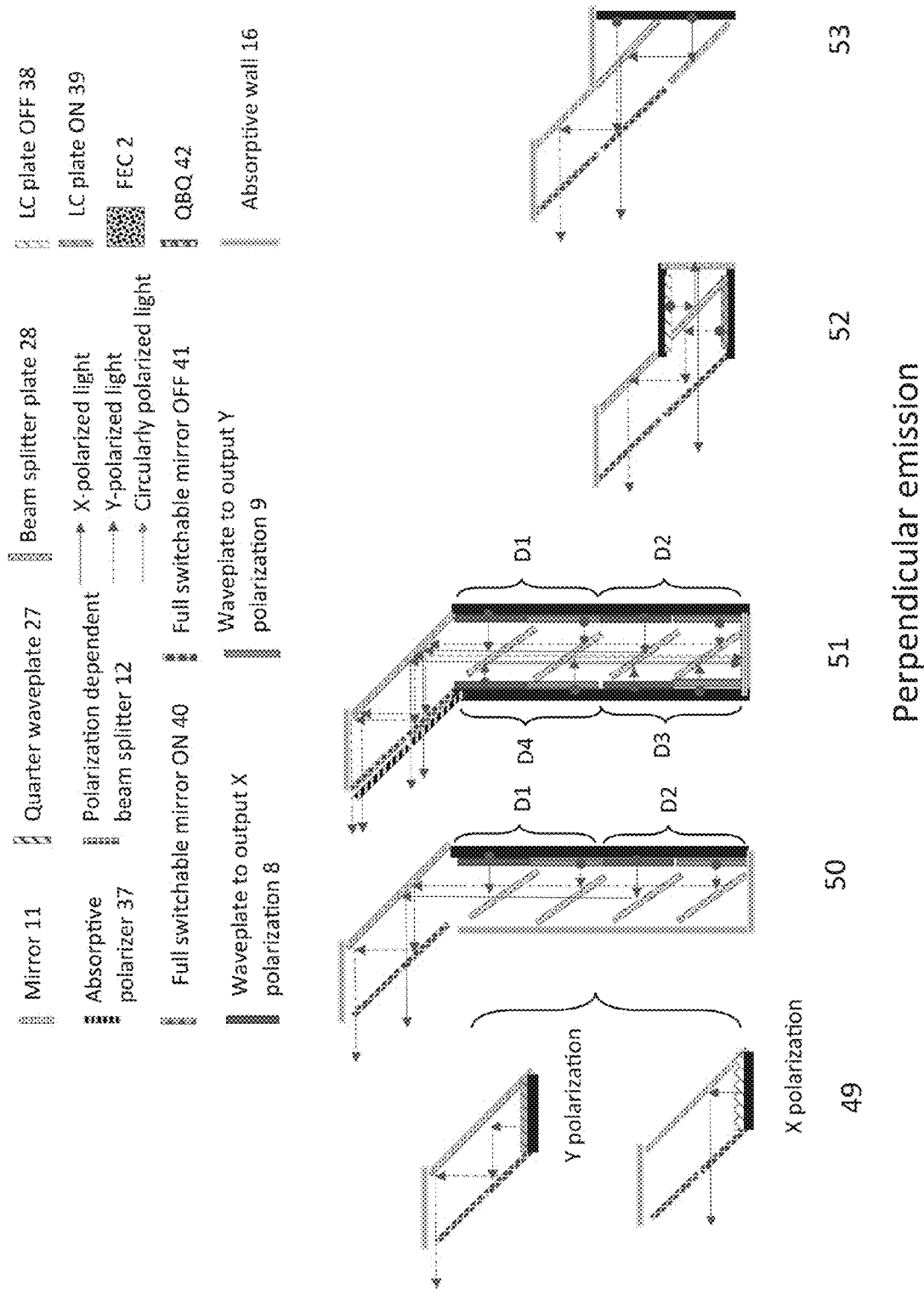
FIG. 8A illustrates schematic side views of example embodiments for passive polarization-based aperture extension with an FEC with perpendicular emission.

FIG. 8A illustrates schematic side views of example embodiments for passive polarization-based aperture extension with an FEC with perpendicular emission. An embodiment 49 shows a light path with arrows for X polarization and Y polarization through the aperture 4. In some embodiments, the embodiment 49 shows that the aperture 4 may be directly coupled to an emissive display 1 with a lucent connector (LC) on top that can be used to change the polarization of the light and therefore can be used to change the light path inside the aperture 4. Another embodiment 50 shows a light path with X and Y polarization that is similarly shown in FIG. 1A and FIG. 2B. As can be seen in this embodiment 50, four enter gates 3 in the FEC 2, but only two depths are shown at the extended aperture 4, which is because the image by each gate from a pair of adjacent enter gates 3 combines into one larger image. Thus, the aperture extension allows the FEC 2 to be thinner. If there was no aperture extension, then the reflector size inside the FEC 2 would be the same size as the aperture 4. Another embodiment 51 has twice as many depth levels in comparison to the embodiment 50, which is achieved by having two emissive displays 1 and a mirror 11 at the bottom of the FEC 2. The light from the right-side emissive display 1 goes up towards the aperture 4, but the light from the left-side emissive display 1 travels down towards the bottom mirror 11 and is then reflected back up, which extends the distance that light has to travel and consequently makes the image appear even further. Another embodiment 52 has an aperture box 4 coupled to two emissive displays 1 with LC layers flush on top of the display surface to provide larger aperture size with smaller sized displays, which allows embodiments of the present invention to be configured to be space efficient and compact. Another embodiment 53 schematically depicts one emissive display 1 and has the FEC 2 overlapping with its aperture 4.

Figure 8B:
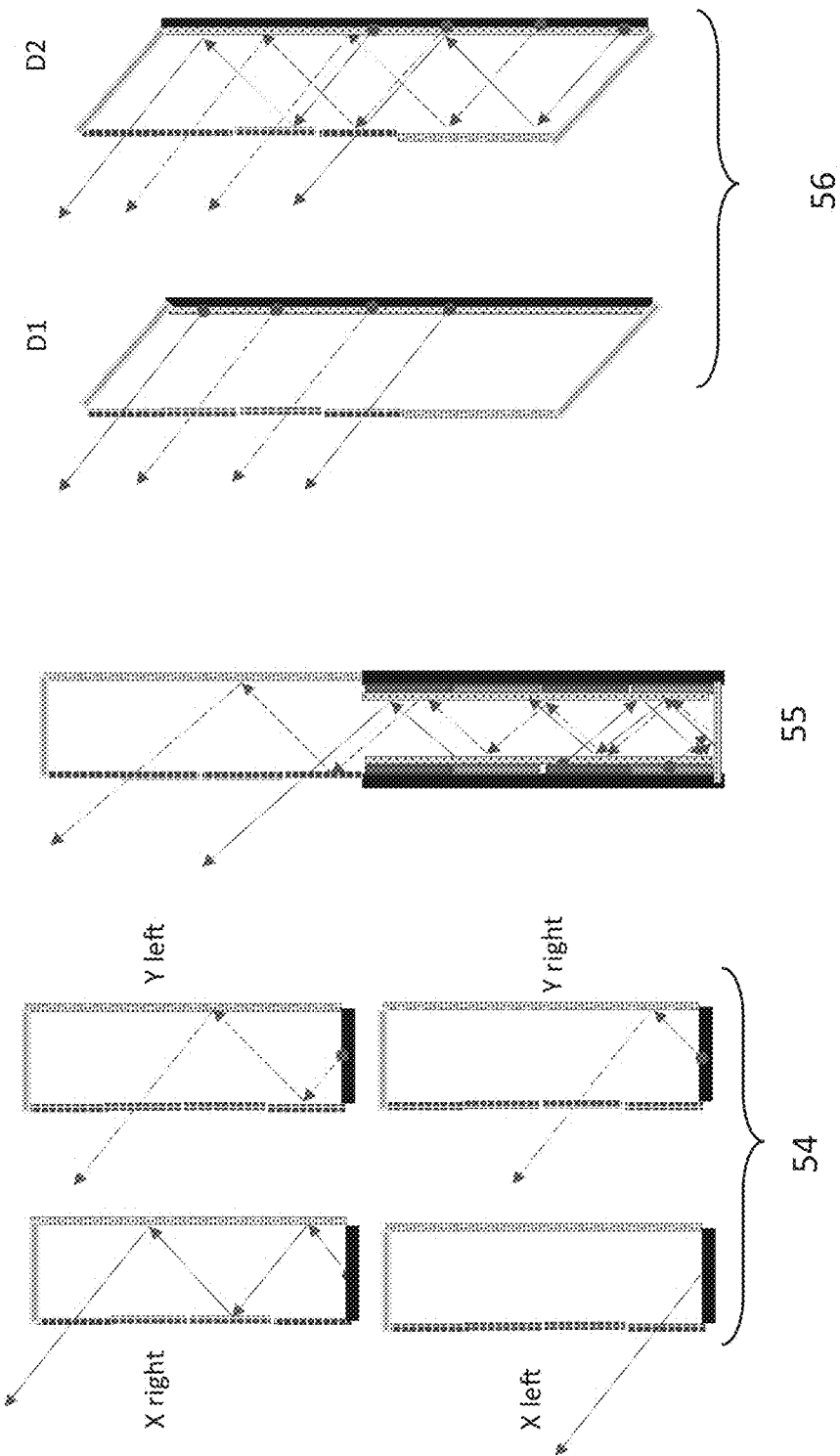
FIG. 8B illustrates schematic side views of example embodiments for passive polarization-based aperture extension with an FEC with angled emission.

FIG. 8B illustrates schematic side views of example embodiments for passive polarization-based aperture extension with an FEC with angled emission. These embodiments can be arbitrarily engineered. However, an embodiment 54 shows a light path for four different polarizations and angles, which are referred to as X right (or X +45°), X left (X) −45°, Y left (Y) −45°, and Y right (Y) −45°. The embodiment 54 schematically depicts the FEC 2 being replaced with a directional display. The challenge in using a directional display to feed such an aperture extension is the fact that none of the four sections have the same path, and the light path in fact increases from X left to Y right to Y left and to X right emissions from the aperture 4, which is expected since the gates are offset from the emissive display 1 at the bottom. This type of aperture extension is useful when the emissive display 1 at the bottom is replaced with an FEC with angled emission, and the FEC 2 compensates for this difference in the distance and allows the entire aperture 4 to be perceived at the same depth. Therefore, the gates that are closer to the exit have to show images that are coming from higher roundtrips inside the FEC 2.

Another embodiment 55 schematically depicts two emissive displays 1 being at two opposing sides of the FEC 2. Moreover, the light partially goes upward toward the aperture 4 similar to FIG. 3B but partially goes downward towards the base of the FEC 2, which has a mirror 11 in this embodiment to provide even further depth instead of having an absorptive layer 16 shown in FIG. 3B. The Y polarized light in this embodiment travels downward and hits the mirror 11 at the bottom and then reflects between the beam splitters 28 that are vertically positioned flush on the emissive displays 1 on opposing sides of FEC 2. The Y polarized light in this embodiment then travels through the aperture 4 in order to be guided to the desired exit gate from the plurality of exit gates 5, wherein the desired exit gate depends on the polarization and angle of the light. Another embodiment 56 schematically depicts the FEC 2 being superimposed onto the aperture 4 in the passive aperture extension with angled emission family of designs. The first depth D1 is directly exiting the aperture 4 from the back emissive display 1 with no reflection at all. In contrast, the second depth D2 reflects twice before the second depth D2 exits the aperture 4. A difference between the embodiment 56 and the embodiment 50 is that the aperture 4 is two-thirds of the size of the emissive display 1 as opposed to half of the size of the emissive display 1, which is shown in the embodiment 50. However, a problem with this embodiment is that some section of the emissive displays 1 needs to show the content for the first depth Dl at one instance of time and then need to show the contents for the second depth D2 at another instance of time, whereas the embodiment 50 with its allocated sections of the emissive display 1 can always show the content for only one depth and need not toggle between depths to provide a higher frame rate at each depth. Time multiplexing is a powerful way to extend the idea of aperture extension to infinite or desired number of gates as the gates can be switched on and off or be open and closed at desired time.

Figure 8C:
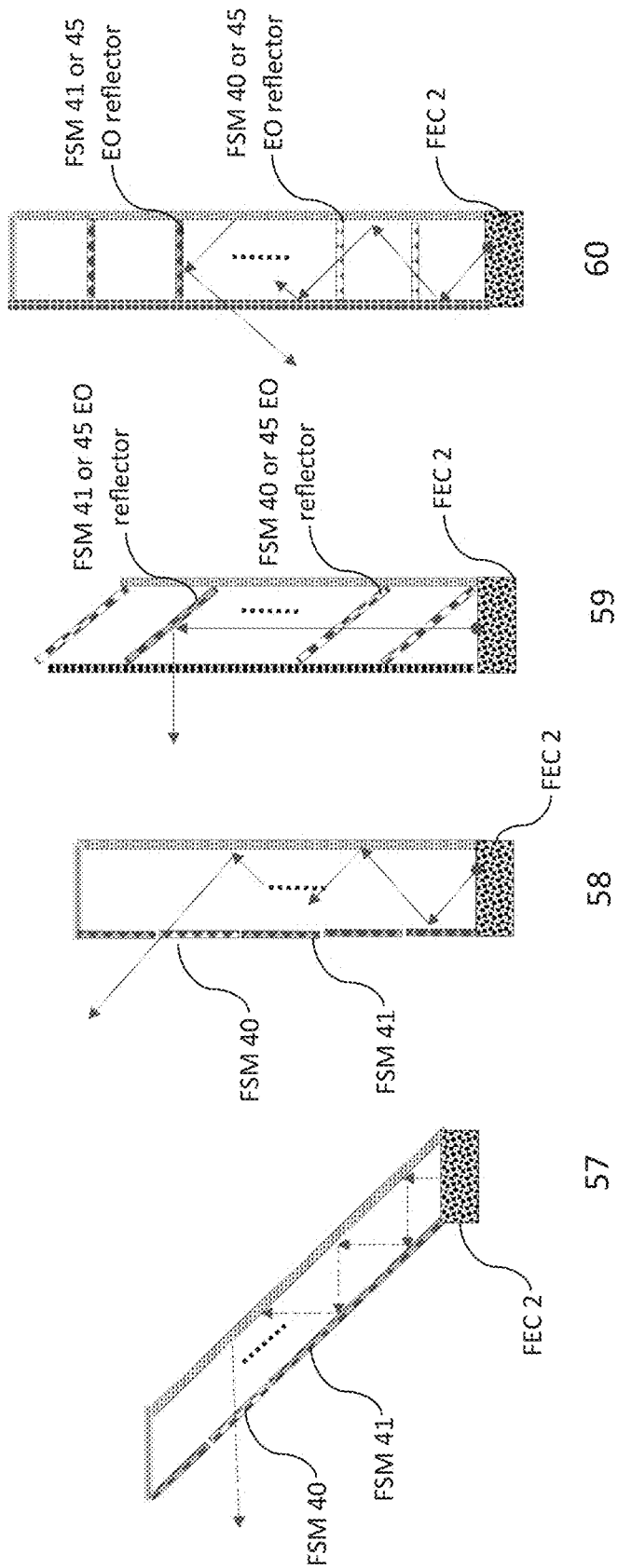
FIG. 8C illustrates schematic side views of example embodiments for active time multiplexed aperture extension with an FEC with angled or perpendicular emission.

FIG. 8C illustrates schematic side views of example embodiments for active time multiplexed aperture extension with an FEC with angled or perpendicular emission. These embodiments are active because these apertures have active optical materials such as liquid crystals, which change optical properties based on an applied electric signal. An embodiment 57 schematically depicts an aperture extension with perpendicular emission being enabled by full switchable mirror (FSM) at ON or reflective 41 and FSM at OFF or transparent 40, which allows the light to keep climbing up to higher exit gates 5 of the aperture 4, until the light finds an open exit gate (i.e., the exit gate which has a mirror set to transparent) and horizontally exits the aperture 4. Another embodiment 58 schematically depicts an aperture extension with angled emission being enabled by full switchable mirror (FSM) at ON or reflective 41 and FSM at OFF or transparent 40, which allows the light to keep climbing up to higher exit gates 5 of the aperture, until the light finds the open exit gate 5 (i.e., the exit gate which has a mirror set to transparent) and exits the aperture 4 at an angle. Another embodiment 59 schematically depicts an active aperture with angled emission. Such architecture was introduced in FIG. 4, and the difference between the embodiment 59 and the embodiment 57 is that the light is guided to the open exit gate through transmission not through reflection. Thus, the embodiment 59 is designed to be the opposite of the embodiment 57 in principle. The embodiment 60 is designed to be the dual of the embodiment 57 for angled emission but again with opposite functionality for mirrors. In the embodiment 60, the switchable mirrors are transparent, and the mirror that exits the light should be at "ON" mode or reflective mode so that the light can passes through the mirror, wherein the switchable mirrors for the embodiment 57 and the embodiment 58 that exits the light are in the "OFF" mode. In other words, the switchable mirrors for the embodiment 57 and the embodiment 58 reflect the light to get the light to the desired exit gate; whereas the switchable mirrors for the embodiment 59 and the embodiment 60 actually transmit (let the light pass through them) to guide the light to the desired exit gate.

Figure 9A:
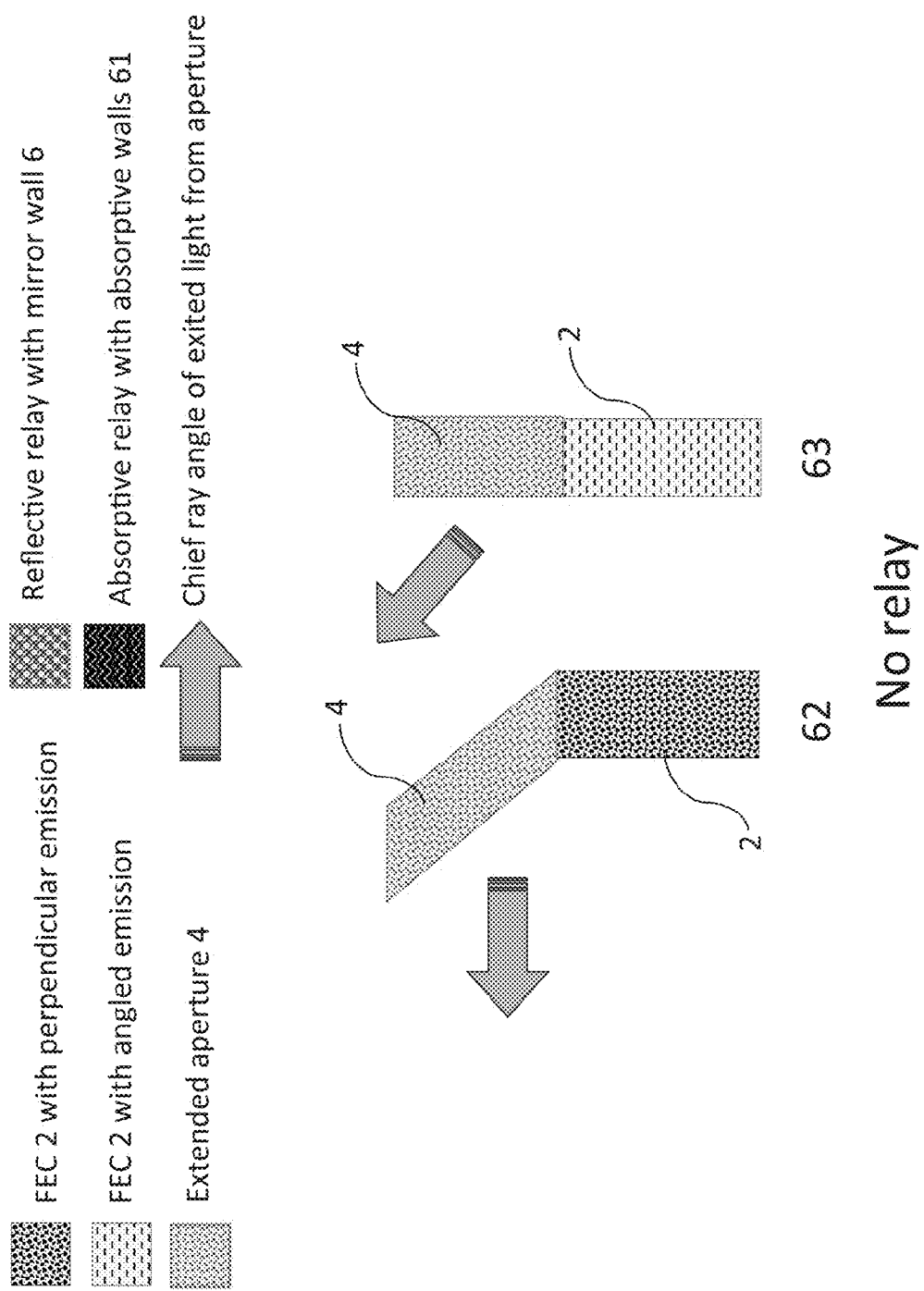
FIG. 9A illustrates schematic side views of example embodiments for lightfield display with passive polarization-based aperture extension with no relay which resembles the FIG. 1A and FIG. 1B.

FIG. 9A illustrates schematic side views of example embodiments for lightfield display with passive polarization-based aperture extension with no relay which resembles the embodiments shown in FIG. 1A and FIG. 1B. An absorptive relay 61 is usually used to stop or absorb the unwanted light that is coming out of the FEC 2 in an undesired direction. FIG. 9A shows general side view profile of the lightfield display with passive polarization-based aperture extension with a perpendicular emission 62 and with an angled emission 63, both of which with no relay involved in the system.

Figure 9B:
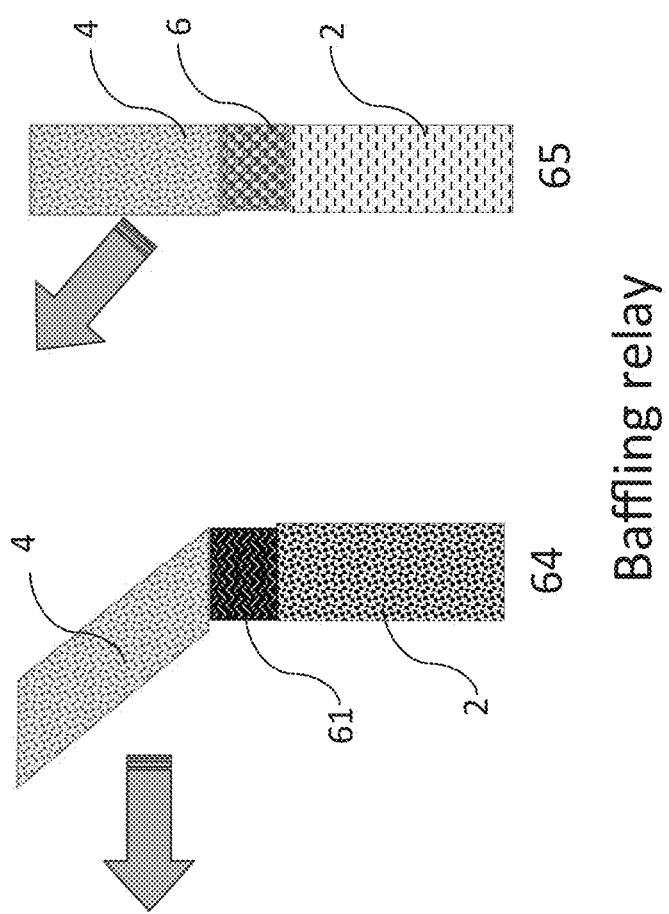
FIG. 9B illustrates schematic side views of example embodiments for passive polarization-based aperture extension for lightfield display with baffling relay.

FIG. 9B shows general side view profile of the lightfield display with passive polarization-based aperture extension with a perpendicular emission 64 using a baffling relay and the lightfield display with passive polarization-based aperture extension with an angled emission 65 using a reflective relay. A reflective relay can be just a set of mirrors to reflect the light inside the system to get the light to the desired angular or polarization profile before the light reaches the aperture 4. In some embodiments, a reflective relay can also help to reduce the stray lights coming out of the FEC 2. The relay structure is preferred to be between the FEC 2 and the aperture 4 and has the purpose of relaying or guiding the light from FEC 2 to the aperture 4. The light from the angled emission 65 is generated at the emissive display 1, then passes through the FEC 2, and then passes or reflects inside the relay structure (i.e., a reflective relay 6 or an absorptive relay 61), which can be arbitrarily engineered to relay or bring the light to the aperture 4.

Figure 9C:
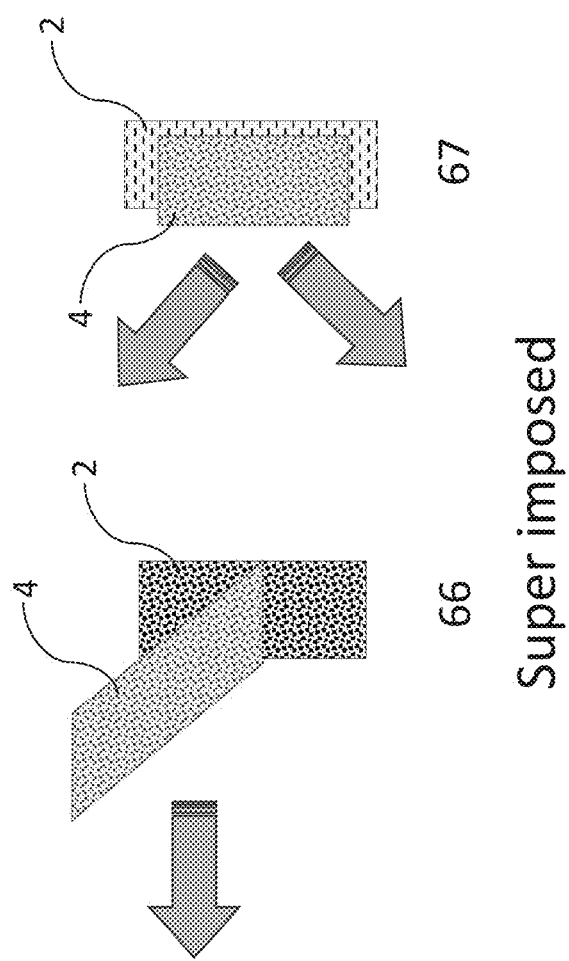
FIG. 9C illustrates schematic side views of example embodiments for passive polarization-based aperture extension for lightfield display with super imposed aperture.

FIG. 9C illustrates schematic side views of example embodiments for passive polarization-based aperture extension for lightfield display with super imposed aperture, wherein one embodiment is shown with a perpendicular emission 66, and wherein another embodiment with an angled emission 67. In FIGS. 9A, 9B, 9C, and 9D, the gray arrows show the direction of the chief ray of light emitted from the aperture 4 to the outside world. Some embodiments have multiple possibilities for the emission direction indicated by two arrows coming at different angles from the aperture 4. When the FEC 2 and aperture 4 are superimposed onto each other, this embodiment of the device becomes more compact but is usually more challenging to create deeper depth.

Figure 9D:
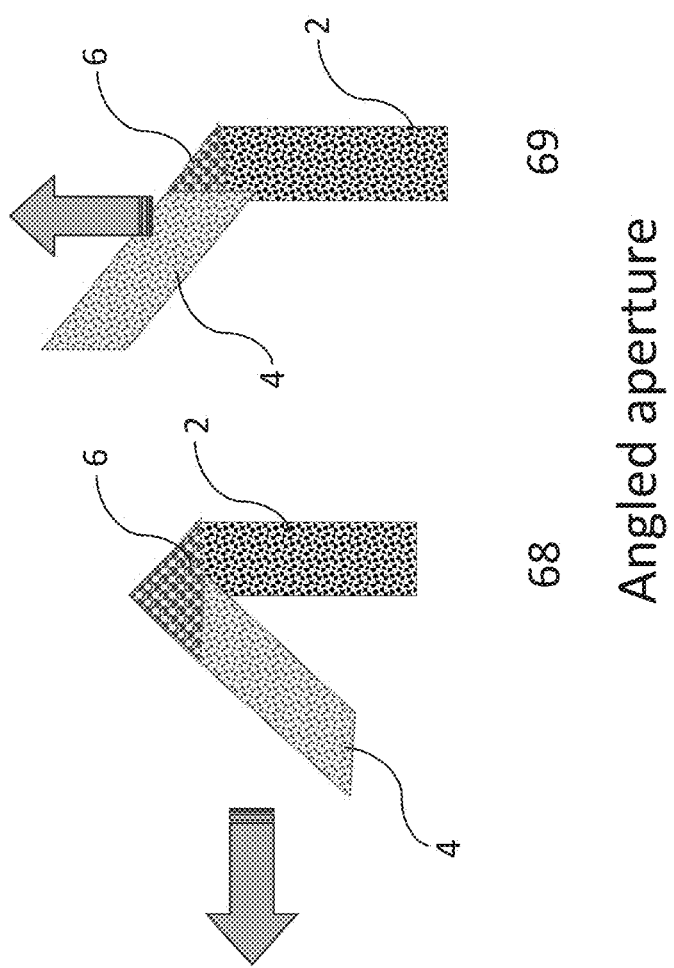
FIG. 9D illustrates schematic side views of example embodiments for passive polarization-based aperture extension for lightfield display with perpendicular emission FEC and folded and/or angled aperture.

FIG. 9D illustrates schematic side views of example embodiments for passive polarization-based aperture extension for lightfield display with perpendicular emission FEC for an angled folded aperture 68 and an angled aperture 69. Moreover, the angled folded aperture 68 and the angled aperture 69 can be arbitrarily engineered but it is preferred that the angle is an integer multiple of 45 degrees. In addition, the reflective relay 6 used with the angled folded aperture 68 has usually two mirrors set with 90-degree angles creating a mirror corner to redirect the light from the FEC 2 to the aperture 4 at the desired angle.

Figure 9E:
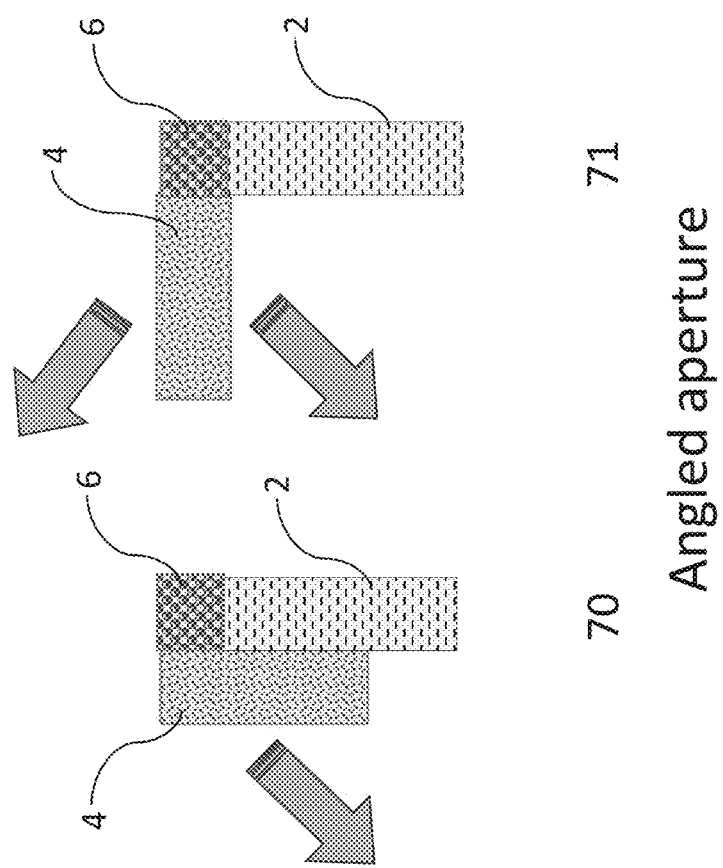
FIG. 9E illustrates schematic side views of example embodiments for passive polarization-based aperture extension for lightfield display with angled emission FEC and folded aperture and angled aperture.

FIG. 9E illustrates schematic side views of example embodiments for passive polarization-based aperture extension for lightfield display with angled emission FEC for a folded aperture 70 and an angled aperture 71. Moreover, the folded aperture 70 is passive yet compact as the aperture 4 is folded on the FEC 2, which is similar to the active design in FIG. 1C. Thus, the folded aperture 70 provides both a compact formfactor with no need for active components.

Figure 10A:
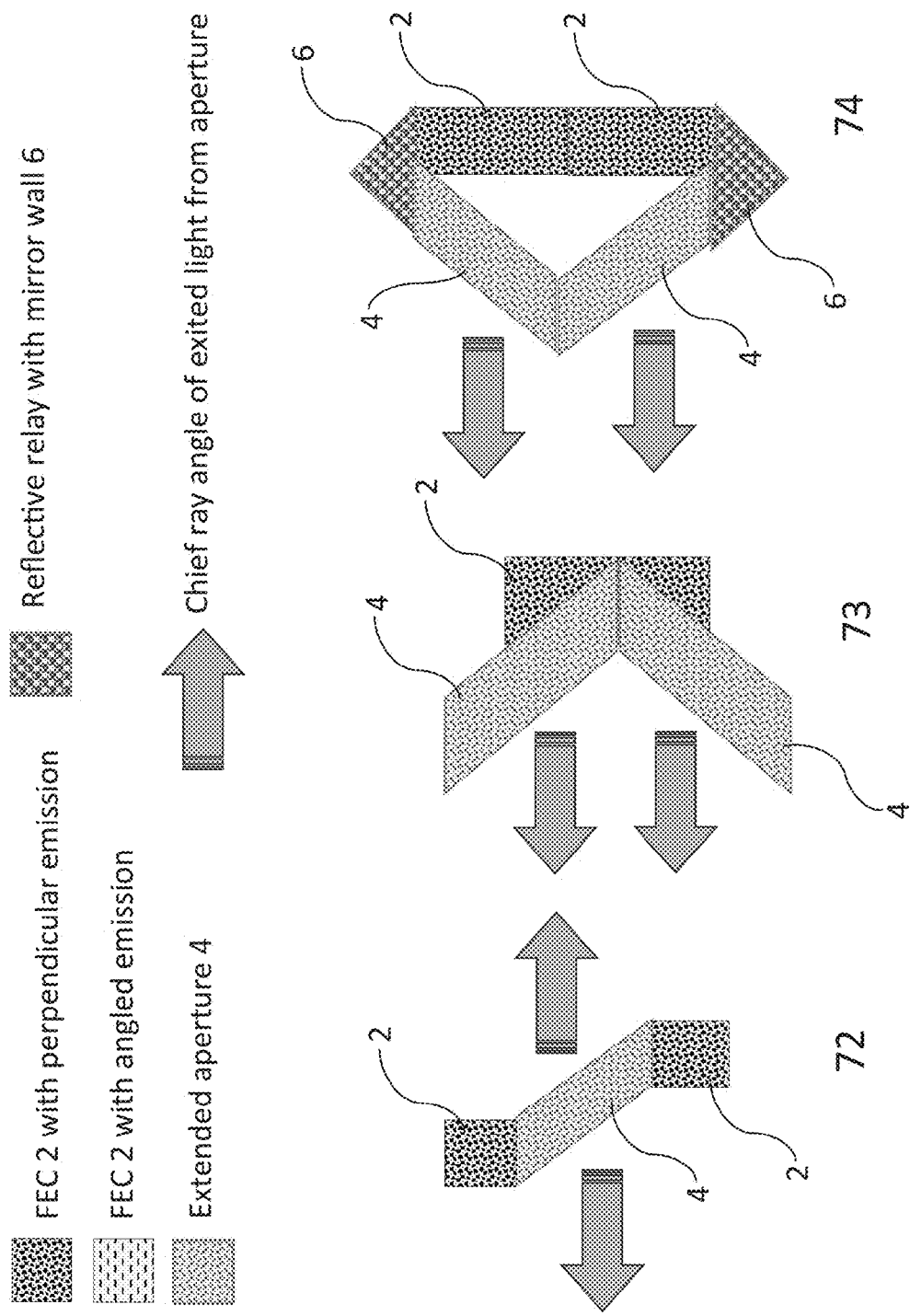
FIG. 10A illustrates schematic side views of example embodiments for passive polarization-based aperture extension for lightfield display with multi-feed perpendicular emission FECs and different relaying geometries.

FIG. 10A illustrates schematic side views of example embodiments for passive polarization-based aperture extension for lightfield display with multi-feed, perpendicular emission FECs and different relaying geometries. An embodiment 72 has one FEC 2 feeding from the top and another FEC 2 feeding from the bottom so that the aperture 4 can output light in two opposing directions. Moreover, the embodiment 72 has no relay structure. Another embodiment 73 has a single FEC 2 that is feeding one aperture 4 at the top and another aperture 4 at the bottom so that the displayed images tile each other (i.e., appear as one larger continuous image). In addition, the embodiment 73 can use the polarization of the emissive display 1 in order to optically increase the size of the emissive display 1. Also, in the embodiment 73, the FEC 2 is superimposed on the aperture box 4. Another embodiment 74 uses two FECs 2 that are feeding two apertures 4 from top and bottom in a symmetric fashion and has one reflective relay 6 for the top aperture 4 and one reflective relay 6 for the bottom aperture 4. Moreover, the embodiment 74 is similar to two copies of the angled folded aperture 68 tiled together in a symmetric fashion.

Figure 10B:
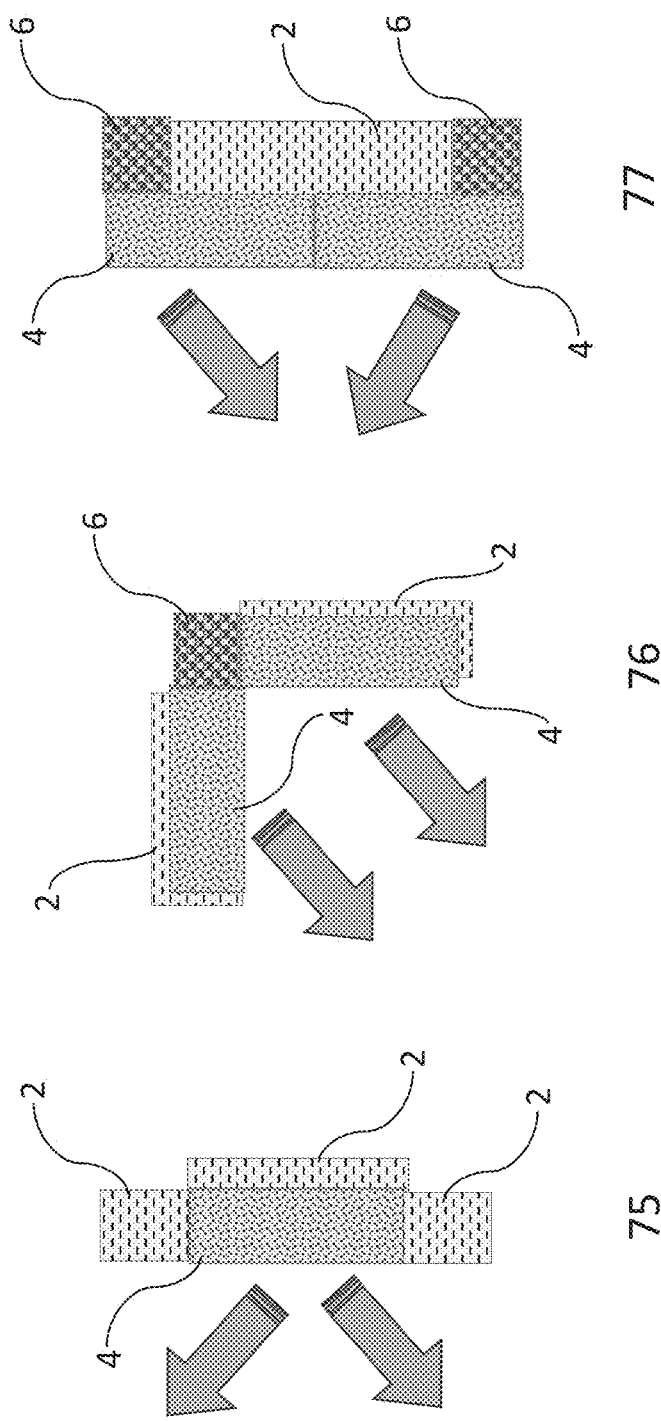
FIG. 10B illustrates schematic side views of example embodiments for passive polarization-based aperture extension for lightfield display with multi-feed angled emission FECs and different relaying geometries.

FIG. 10B illustrates schematic side views of example embodiments for passive polarization-based aperture extension for lightfield display with multi-feed angled emission FECs and different relaying geometries. An embodiment 75 shows an architecture of three FECs 2 feeding a single aperture 4 with an angled emission. This aperture 4 allows the light to exit to the outside world in two different directions as indicated by the gray arrows. Another embodiment 76 is similar to the angled aperture 71 because the embodiment 76 and the angled aperture 71 are mutually feeding such that the top FEC 2 is feeding the bottom aperture 4 and such that the bottom FEC 2 is feeding the top aperture 4. The two FECs 2 mutually use one 90-degree reflective relay 6, and the exited images tile each other into one larger image as noted by parallel direction of the exit ray arrows. Another embodiment 77 is similar to two folded apertures 70 tiled together. In addition, the embodiment 77 allows the light to exit to the outside world in two different directions noted by the gray arrows. In all embodiments in FIGS. 9A, 9B, 9C, 9D, 10A, and 10B, the aperture 4 does not have to be passive and can also be active, and some of such geometries with active apertures is indicated in FIG. 11A and FIG. 11B.

Figure 11A:
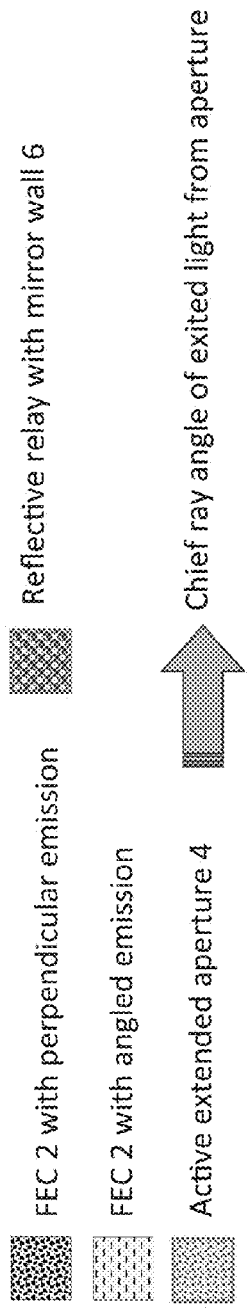
FIG. 11A illustrates schematic side views of example embodiments for active aperture extension for lightfield display with no relay.
Figure 11A:
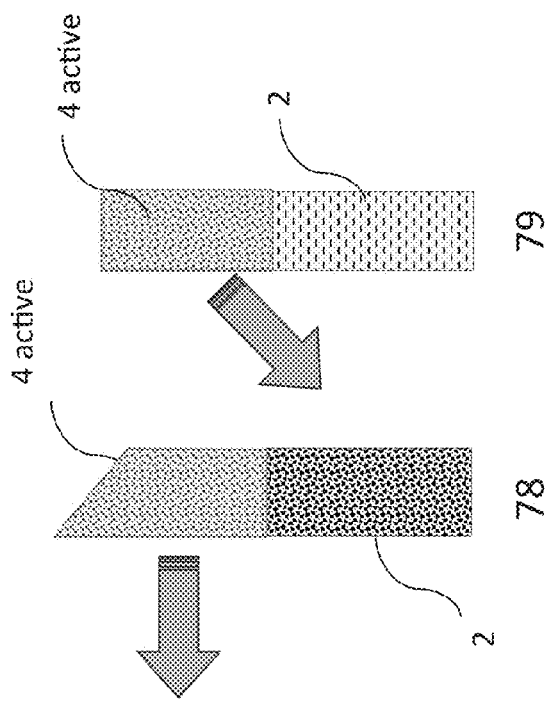
Figure 11B:
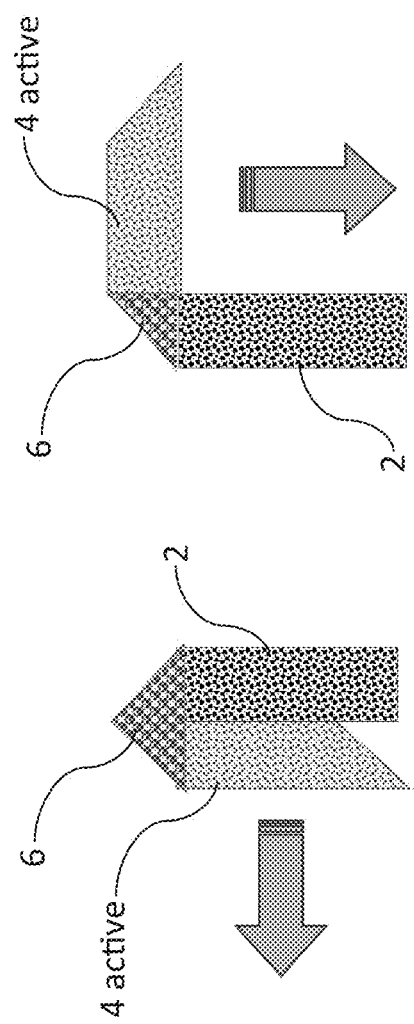
FIG. 11B illustrates schematic side views of example embodiments for active aperture extension for lightfield display with baffling relay.

FIG. 11A illustrates schematic side views of example embodiments for active aperture extension for lightfield display with no relay with a perpendicular emission 78 and an angled emission 78. FIG. 11B illustrates schematic side views of example embodiments for active aperture extension for lightfield display with baffling relay. An embodiment 80 has a baffling reflective relay 6 allowing the aperture 4 to fold on the FEC 2 (i.e., similar to FIG. 1C). An embodiment 81 shows the same architecture as in the embodiment 80, wherein the reflective relay 6 is a single mirror changing the direction of the perpendicular emission from FEC 2 from vertical to horizontal to feed the horizontal active aperture 4. The light is exiting out and going downward as indicated by the gray arrow. The embodiment 81 along with embodiments that include an angled folded aperture 68 or an angled aperture 71 are suitable in electronic devices like a personal computer, a car odometer, or an instrument cluster display because the FEC 2 can be hidden under keyboard or in some other parts of a larger system.

Figure 12A:
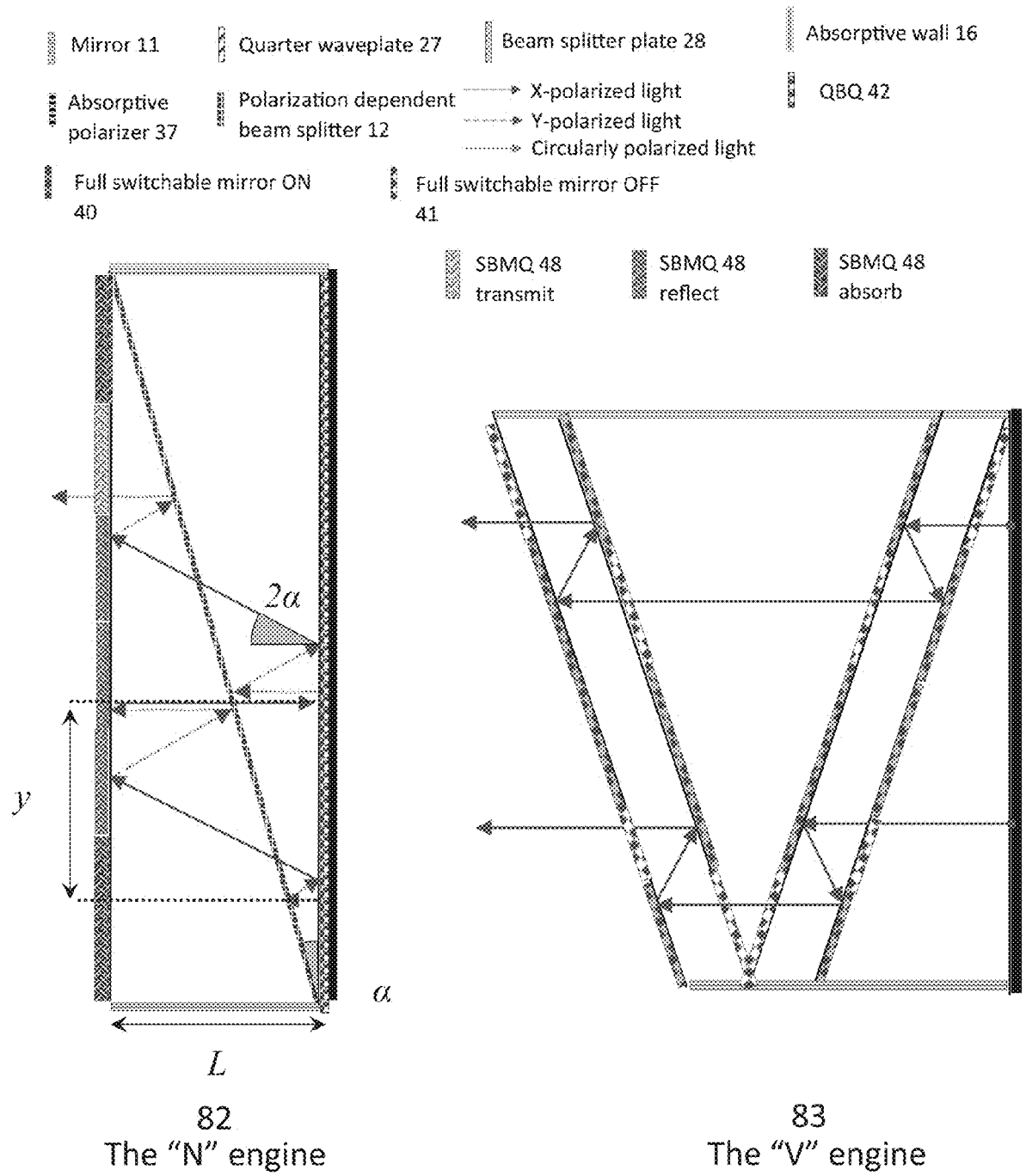
FIG. 12A illustrates schematic side views of more advanced embodiments of active aperture extension with super imposed FEC such as the "N" engine the "V" engine.

FIG. 12A illustrates schematic side views of more advanced embodiments of active aperture extension with superimposed FEC such as the "N" architecture and the "V" architecture. These architectures are referred to as engines because these architectures resemble a system that cohesively generates and then tiles different sections of an image at different depths. These engines can be combined with many other post-aperture optics for different applications. The N engine 82 is shown with an example light path travelling inside to one exit gate at one time instance. The "L" distance is between the plurality of enter gates 3 of the LEC 2 and the plurality of exit gates 5 of the LEC 2, which are flush to the exit gates of the aperture 4 because the N engine 82 has its aperture 4 super imposed on its FEC 2. The translational distance "y" is how far the light vertically travels in one roundtrip of the FEC 2 (i.e., a vertical walk), and the angle "α" is between the tilted intra-cavity layer 29 and the output surface of the emissive display 1.

The output surface of the emissive display 1 is parallel with all of the enter gates 3 and all of the exit gates 5. As noted in Equation 10 and Equation 11 below, a roundtrip of the N engine 82 and a vertical walk of the N engine 82 can be calculated based on the angle "α" and the length "L". The vertical walk "y" allows the optical designer to design the size of each enter gate 3 and each exit gate 5. The rule of the thumb is that the vertical gate size in the N engine 82 should not be smaller than the vertical walk "y" in one roundtrip.

$$N \text{ engine roundtrip path} = \qquad \text{Eq. 10}$$
$$3L + \frac{2L}{\cos(2\alpha)} - \left[ \frac{2 \cdot L \cdot \tan 2\alpha}{1 + \frac{\tan\alpha}{\tan(90-2\alpha)}} \left(1 + \frac{1}{\sin(90-2\alpha)}\right) \right];$$

$$N \text{ engine roundtrip vertical walk} \triangleq y = \left[\frac{2 \cdot L \cdot \tan 2\alpha}{1 - \tan\alpha \tan 2\alpha}\right]; \qquad \text{Eq. 11}$$

The N engine 82 is also shown with the status of the polarization of the light in each roundtrip. The vertical walk is equal for both forward extension and backward extension, but the roundtrip is 2 L longer for the backward extension (FIG. 5B and FIG. 5C). In addition, the V engine 83 works by having two tilted FECs 2, which compensate for each other's vertical walks. The V engine 83 does not have vertical walk or a reduction in aperture size after the light exits the system. Thus, the image is as large as the original image from the emissive display 1 on the right-hand side of this design, and the V engine 83 allows for a desired set of monocular depth by rerouting the light inside its structure as can be seen in FIG. 12A. The drawback of the V engine 83 is that the V engine 83 requires many full switchable mirrors in some embodiments. The angles and sizes in the N engine 82 and the V engine 83 can be arbitrarily engineered. In some embodiments, there are side mirrors 11 on the top and bottom of the N engine 82 and the V engine 83 to allow the light that reaches the side mirrors 11 to be reflected back into the FEC 2. Consequently, the side mirrors 11 extend the depth of the architectures even further. Also, in terms of the N engine 82 and the V engine 83, the status of each enter gate 3 and each exit gate 5 is time multiplexed and programmed in such a way to provide the desired depth at the desired time. The typical program is a periodic set of status for the gates to allow the light to exit the system in the most effective way.

Figure 12B:
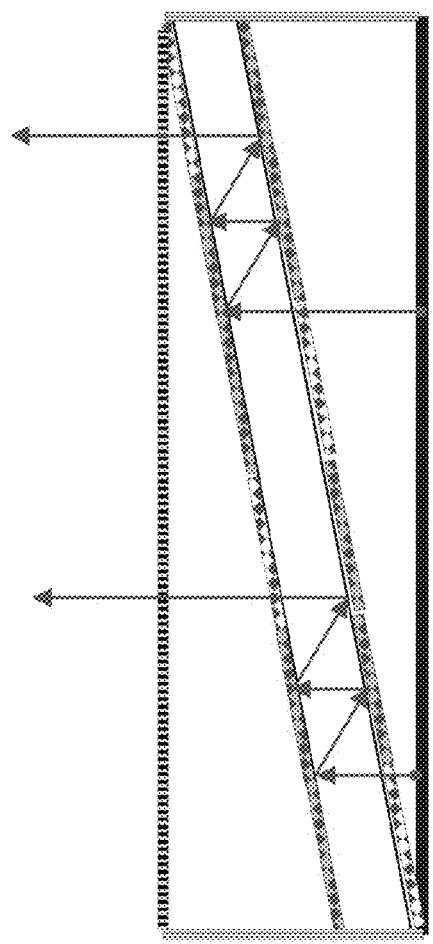
FIG. 12B illustrates schematic side views of more advanced embodiments of active aperture extension with super imposed FEC such as the "N-V" engine the "M" engine.
Figure 12B:
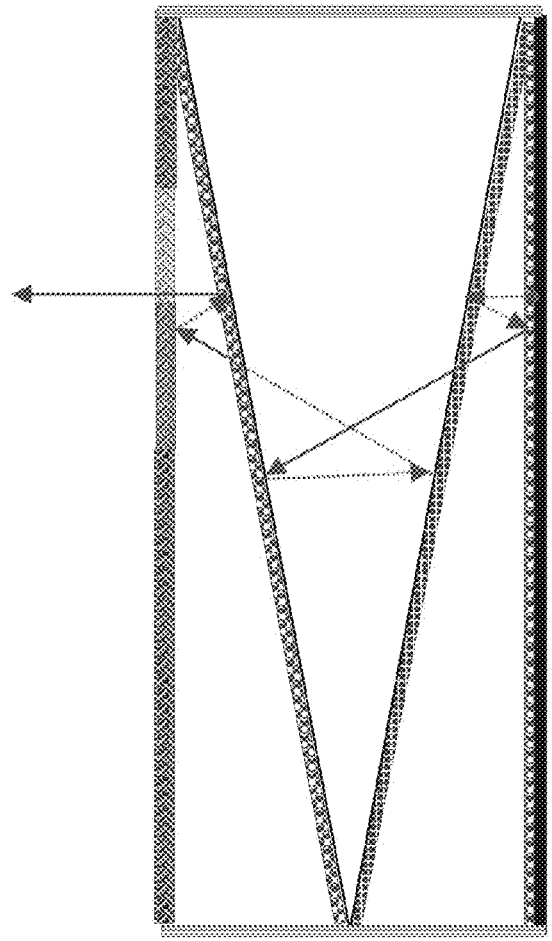

FIG. 12B illustrates schematic side views of more advanced embodiments of active aperture extension with superimposed FEC such as the "N-V" architecture and the "M" architecture. The N-V engine 84 is a hybrid of the N engine 82 and the V engine 83 and works by having one of the tilted FECs 2 of the V engine 83. Moreover, the N-V engine 84 needs a lower number of switchable gates, but, similar to N engine 82, the N-V engine 84 has a vertical walk. The light initially exits the emissive display 1 and then enters the tilted FEC 2 through an OFF FSM, then hits the second layer of the tilted FEC 2 in the middle, and then either reflects back and up or it goes through the second layer depending on the status of the FSM on that layer. FIG. 12B shows the case where the beams go through two roundtrips in the tilted FEC 2 before exiting the tiled FEC 2. At each roundtrip, the light also travels upward a bit, until the light reaches the FSM that is OFF or transparent, which allows the light to exit the FEC 2. In addition, the light passes through an absorptive polarizer 37 before the light reaches the exit pupil 33 of the display system. The absorptive polarizer 37 is used to reduce the ambient reflection from the surface of the aperture 4.

As can be seen in FIG. 12B, the M engine 85 allows an aperture extension at the same size as the emissive display 1 while providing monocular depth. Similar to the V engine 83, the M engine 85 does not have a vertical walk, but, similar to the N engine 82, the M engine 85 requires SBMQ. For the M engine 85, the light initially exits the emissive display 1, then goes through angular profiling layers 7 (not shown in this simplified illustrations), then goes through a vertical QBQ 41, reflects from the tilted intra-cavity layer 29 (i.e., which is a wire grid polarizer in this case), then reflects back and at an angle towards the vertical QBQ 41, and then rotates the polarization by 90 degrees with the vertical QBQ 41 while preserving the angle, and then reflects back towards the tilted intra-cavity layer 29. The light now has polarization that is aligned with the pass angle of the tilted intra-cavity layer 29 and therefore passes through the tilted intra-cavity layer 29. The light is now at the center of the M engine 85 and hits the tilted QBQ 41 (i.e., which is angled in a mirroring fashion to the tilted intra-cavity layer 29) and is on the left side of the tilted intra-cavity layer 29. The titled QBQ 41 causes the light to reflect at horizontal angle, and, since the structure is QBQ based on its layer matrix, the tilted QBQ 41 flips the polarization of the light by 90 degrees. Thus, the horizontally-reflected light does not pass back through the tilted intra-cavity layer 29. The light that is now in Y polarization passes through the tilted QBQ 41, is changed into X polarization, and hits the exit gate of the FEC 2, which is superimposed onto the exit gate of the aperture 4. The exit gate, which is an SBMQ, is set to a reflective mode so that the exit gate reflects the light to the tilted QBQ 41, and the tilted QBQ 41 again switches back to Y polarization. At this instance, the light is at the height with an exit gate, which is also an SBMQ, is set to a transmit mode and is able to exit the aperture 4. All other exit gates are set to an absorb mode in order to absorb any unwanted light. In some embodiments, mirrors 11 or MQ at the top and bottom of the FEC 2 are used to redirect the light that reaches the mirrors 11 to go back into FEC 2.

Figure 13:
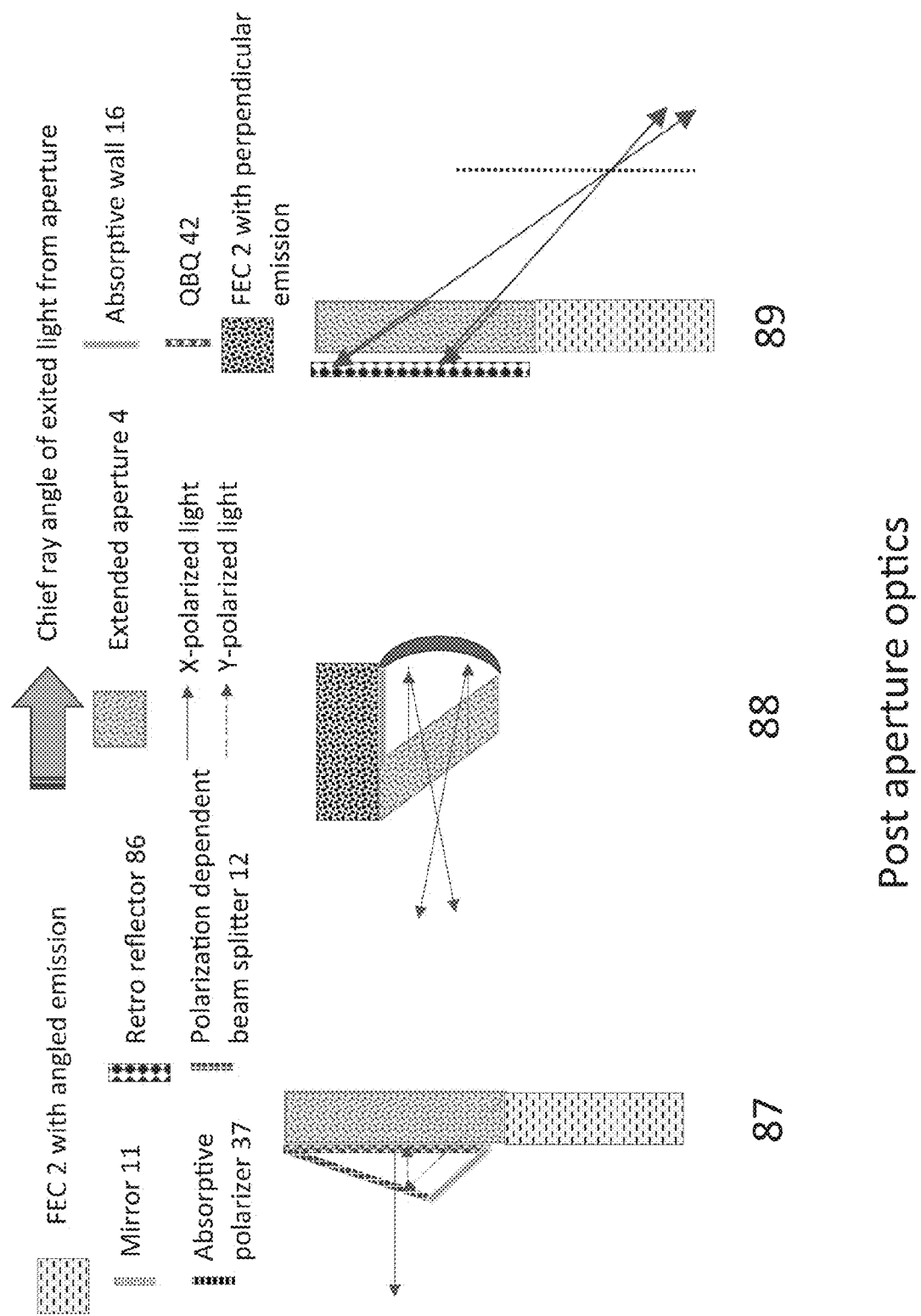
FIG. 13 illustrates schematic side views of example embodiments for post aperture optics and how they may impact the light path, angle, polarization or other properties.

FIG. 13 illustrates schematic side views of example embodiments for post-aperture optics, and how those embodiments may impact the light path. An embodiment 87 shows a set of aperture optics set on a lightfield display with a passive extended aperture and an angled emission. The embodiment 87 shows how the angled emission can be corrected with post-aperture optics, which is agnostic of whatever the light has gone through before the exits the aperture 4. Thus, the embodiment 87 can be used with any other embodiments using a FEC with angled emission either active or passive. As noted, the light comes out of the aperture 4 at a 45-degree angle and upward. The light then hits a tilted polarizer 12 on the left that is cross polarized with that light (i.e., which has Y polarization in this non-limiting example), then becomes horizontal and reflects toward a QBQ (i.e., which changes the light to X polarization), and then passes through the tilted polarizer 12 and into the world. Moreover, another embodiment 88 uses an FEC with folded passive aperture and perpendicular emission, which feeds a visor at the back. In embodiment 88, the aperture 4 of the is half transparent, and the mirror at the back of the aperture 4 is a beam splitter. Thus, the light goes into the outside world after being impacted by the back visor. The embodiment 88 can be implemented in a heads-up display with multi-layer depth and small formfactor. The post-aperture optics can also be, but is not limited to, a simple lens group, a Fresnel lens, a prismatic film, or a sheet of protective glass for the device. In addition, another embodiment 89 uses a lightfield display with a passive aperture extension and a transparent aperture (i.e., the mirror 11 at the back of the aperture 4 shown in FIG. 3B is replaced with a beam splitter). The embodiment 89 for the post-aperture optics is a retroreflector, which is a layer with micro-corner arrays or micro-bids in order to reflect the light at the exact angle that the light is incident on its surface. The retroreflector reflects the light back and creates a real image of the depth that is generated by the FEC 2. The real image is an illusion that pops out from the device. Majority of the embodiments mentioned in the present disclosure can have a post-aperture optics with a transparent aperture and a retroreflective, which creates the effect of an image appearing as if the image is coming out of the device rather than sinking in.

The post-aperture optics can have "arbitrary optical parameter" variations and can be arbitrarily engineered to provide the desired profile. Similar aperture extension and FEC combinations shown in FIG. 1 through 13 can also be used for imaging purposes. The only difference in case of imaging is that the light is going through some pre-aperture optics, then goes through the FEC 2, and then creates an image on where the display pixels used to be in display designs. FIG. 14 shows some examples to better clarify this.

Figure 14A:
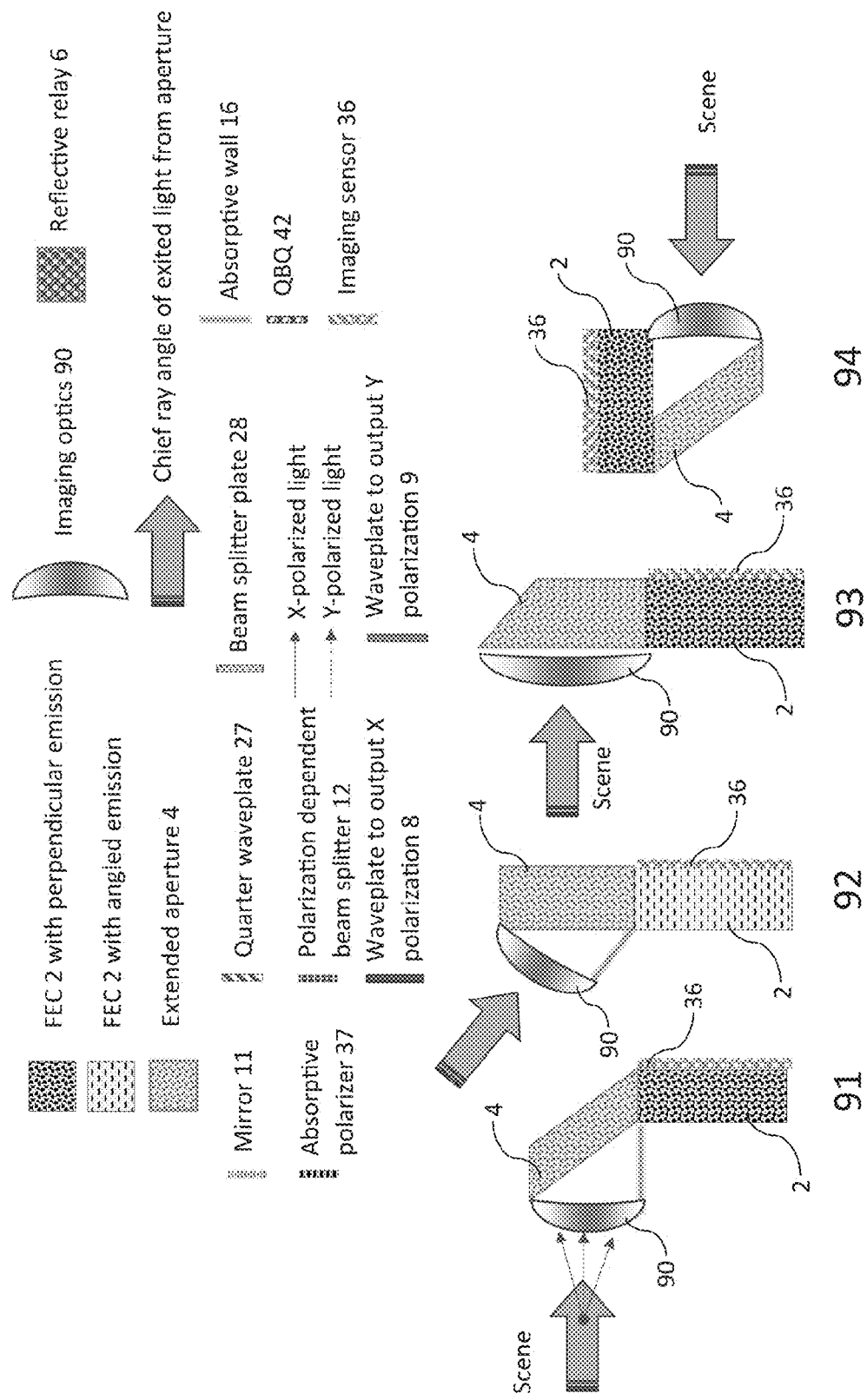
FIG. 14A illustrates schematic side views of example embodiments for imaging system with passive polarization-based aperture extension or active time-multiplexed aperture with no relay or folded aperture.

FIG. 14A illustrates schematic side views of example embodiments for imaging system with a passive polarization-based aperture extension or an active time-multiplexed aperture with no relay or folded aperture. An embodiment 91 is the imaging version of the embodiment shown in FIG. 1A. In embodiment 91, the light enters an imaging optics 90 (i.e., which can be a lens or a lens group) and then enters the extended aperture 4. The light then goes vertically toward the FEC 2 and creates an image at the imaging sensor 36 on the right side of the FEC 2. Another embodiment 92 is the imaging version of the embodiment shown in FIG. 1B. In embodiment 92, the light enters the imaging optics 90 and then enters the extended aperture 4 at a 45-degree angle. The light from different sections of the aperture 4 then enters the FEC 2 at different polarizations and angles (i.e., X left, X right, Y left, and Y right) and then tiles an image at the imaging sensor 36 based on the polarization and angle. Another embodiment 93 is the imaging version of the embodiment 59. In the embodiment 93, the aperture 4 is active so that some multiplexing can be used to indicate which part of the image should be received at what section of the imaging sensor 36 at what time. The light from the scene (shown by the arrow) enters the imaging optics 90 and then fed into the active aperture 4, which sends the light from different sections of the aperture 4 to the FEC 2 at the bottom in vertical fashion. The FEC 2 then feeds the light to the imaging sensor 36 based on which FSM is programmed to be ON or OFF at a given time. In addition, one major advantage of such aperture extension for imaging systems are that a very large lens can be coupled into a very small sensor at an extremely compact distance. This is one of the major challenges for designing more compact camera on a phone for example. The second major advantage is that, since the FEC 2 is involved in the design, the FEC 2 can help to electronically adjust the distance between the lens and the sensor, not by mechanically moving the lens further away from the sensor, but by electronically and optically selecting what path that the light should take. Another embodiment 94 uses a folded passive aperture with perpendicular emission. In the embodiment 94, the light again enters the imaging optics 90, then enters the extended aperture 4, then goes upward to the FEC 2 through a reflective baffle (not shown for simplicity), and then feeds into the FEC 2. The FEC 2 compensates for the length differences that the light from different gates of the aperture 4 should travel, and the image or images are then formed on the imaging sensor 36.

Figure 14B:
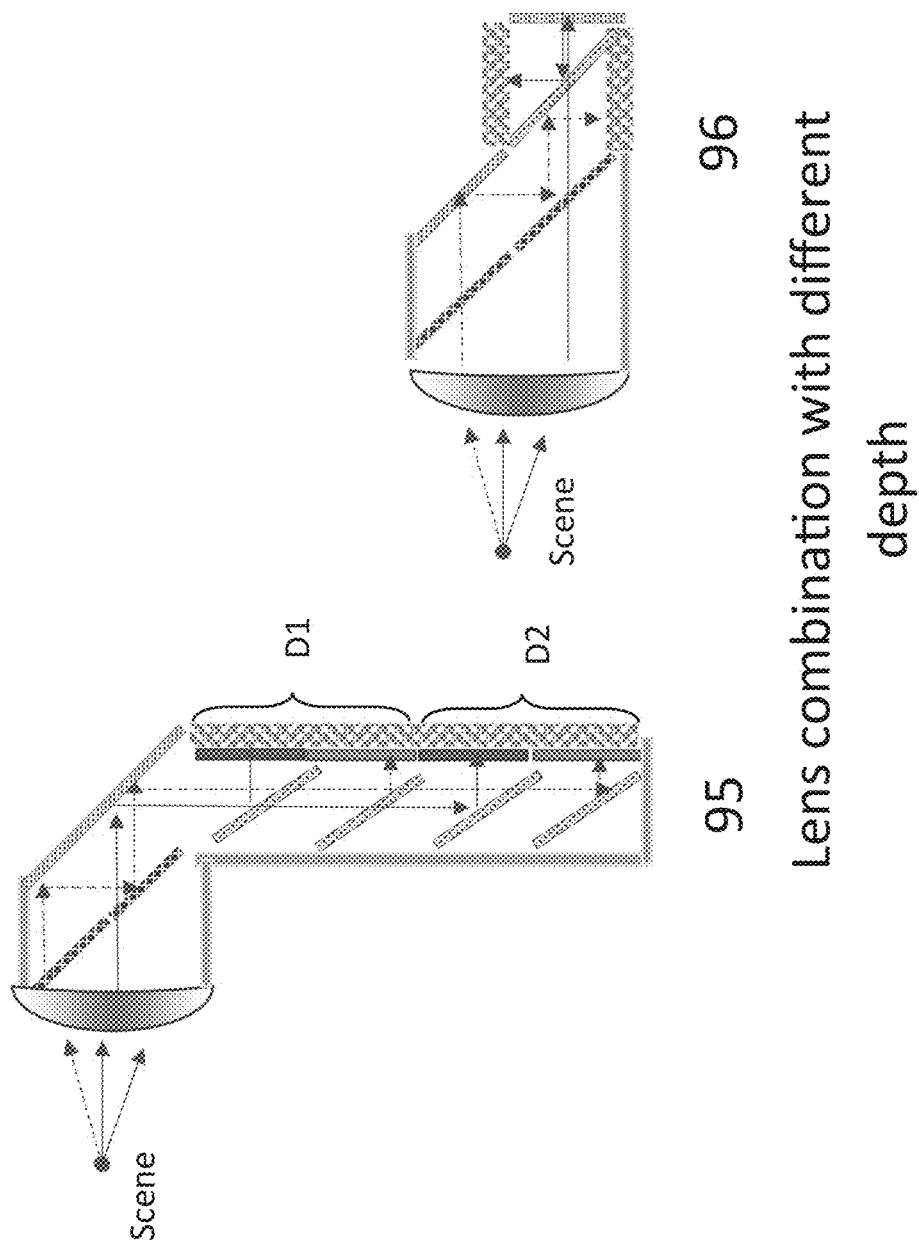
FIG. 14B illustrates schematic side views of example embodiments for passive polarization-based aperture extension and how it may feed the light into one or multiples sensors for imaging purposes.

FIG. 14B illustrates schematic side views of example embodiments for a passive polarization-based aperture extension and how the passive polarization-based aperture extension may feed the light into one or multiple sensors for imaging purposes. An embodiment 95 shows the light path from the scene to the imaging sensor 36 and has the same arrangement of components as the embodiment 91. The light initially goes through the imaging optics 90, then is polarized by the tilted reflective polarizer, then hits the back mirror 11 of the aperture 4 (i.e., once if the light is in X polarization, and twice if the light is in Y polarization), and then goes towards the FEC 2 in perpendicular fashion. Moreover, the light then is guided by the reflectors (i.e., 45-degree beam splitters) inside the FEC 2 to the imaging sensor 36, which has absorptive polarizers that are cross polarized in pairs. Thus, each pair of absorptive polarizers can image one depth. For example, the embodiment 95 can image two different depth at different sections of one imaging sensor 36. Depth here refers to where the distance in the scene that is in focus at the image plane. The embodiment 96 is the imaging version of the embodiment 52. In the embodiment 96, the light from the scene goes through the imaging optics 90, then is polarized via two reflective wiregrids, and then reflects from the back of the aperture 4 (i.e., once or twice depending on the polarization). Since the embodiment 96 is a superimposed design, the FEC 2 is overlapping with the aperture 4 with a beam splitter that is at the lower back side of the aperture 4. The light then goes through or reflects from the beam splitter depending on the polarization. The light in Y polarization is reflected downward toward the imaging sensor 36. The light in X polarization hits the back mirror 11 of the FEC 2, reflects upward off the mirror 11, and creates the second section of the image on the imaging sensor 36 at the top of the FEC 2.

Similar to display systems with multi-feed structures shown in FIG. 10A and 10B, the imaging systems can have multiple sensors or can have multiple lenses imaging different directions or depth. The arrangement of such architecture can be arbitrarily engineered. For example, based on the embodiments shown in FIG. 10A and 10B, the imaging version of the embodiment 72 uses two lenses at two different sides of the aperture 4, which allows for imaging in 360 degrees. Moreover, the imaging version of the embodiment 73 can optically couple a large lens with a long focal length into a small imaging sensor at a compact distance. In addition, the imaging version of the embodiment 76 allows for tiling two sensors in order to render an image from a large lens with a longer focal length in comparison to an arrangement with no FEC and aperture extension in place.

Embodiments that are between imaging and display system or hybrid of both are also disclosed in the present disclosure. Such hybrid systems can be used for visual effects and specialized imaging applications and for augmented reality glasses. In hybrid systems, the aperture 4 needs to be semi-transparent by changing the back mirror 11 with a beam splitter. A semi-transparent aperture box 97 is different than the previous aperture boxes because the semi-transparent aperture box 97 allows a portion of the light from the scene at the back of the semi-transparent aperture box 97 to come into the system since the back mirror is now replaced with a beam splitter.

Figure 15A:
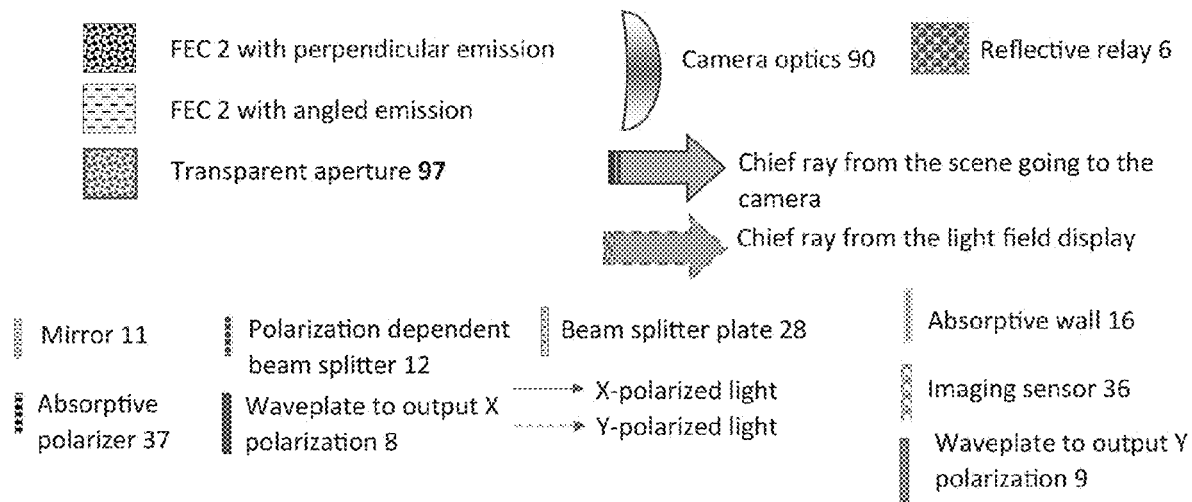
FIG. 15A illustrates schematic side views of example embodiments for passive polarization-based aperture extension for lightfield display feeding an imaging system for augmented real-time visual effects.
Figure 15A:
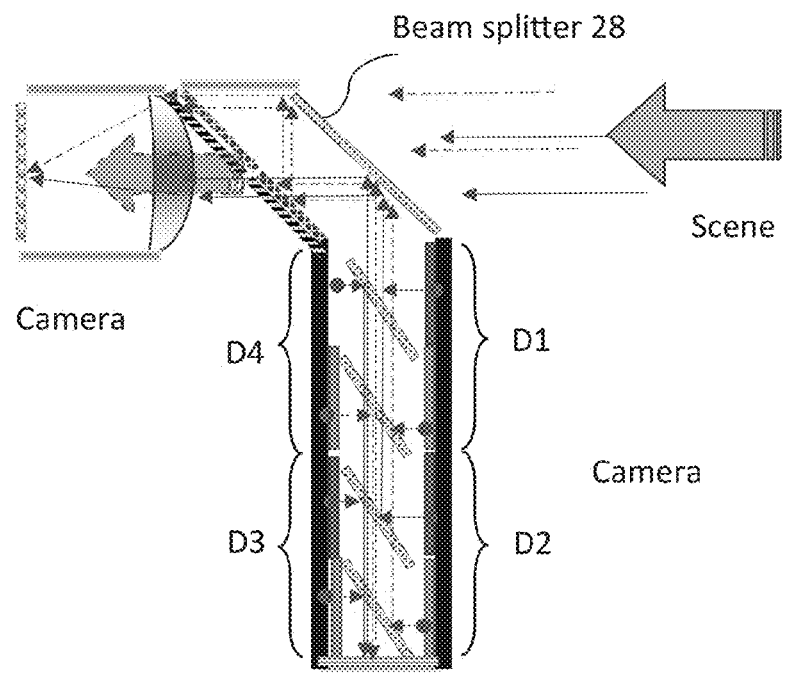

FIG. 15A illustrates schematic side views of example embodiments for a passive polarization-based aperture extension for lightfield display feeding an imaging system for augmented real-time visual effects. An embodiment 98 shows how the light from two emissive displays 1 at the two opposing sides of the FEC, which is an arrangement similar to the embodiment 51 and is providing four different depths that can be mixed with the light coming from the outside world by using the semi-transparent aperture box 97. In addition, the embodiment 98 replaces the back mirror 11 with a beam splitter. The mixed light is then imaged to an imaging sensor 36 via the imaging optics 90. More specifically, the light from the two emissive displays 1 goes through the FEC 2, then passes into the semi-transparent aperture box 97, and then exits through the lens allowing the light to be imaged on the imaging sensor 36. The light from the outside world simply passes through the semi-transparent aperture box 97 and is only polarized and then imaged by the imaging optics 90 onto the same imaging sensor 36. The imaging sensor 36 is used to image the outside world as well as some digital content that is set at a desired depth superimposed on top of it. Since these visual effects or digital content is added while the camera is recording, the augmentation can be done in real time as opposed to post-processing the video. Additionally, the digital content experiences the same lens color and distortion profile as the light from the scene so that the augmentation will be seen as much more realistic than post-processing.

Figure 15B:
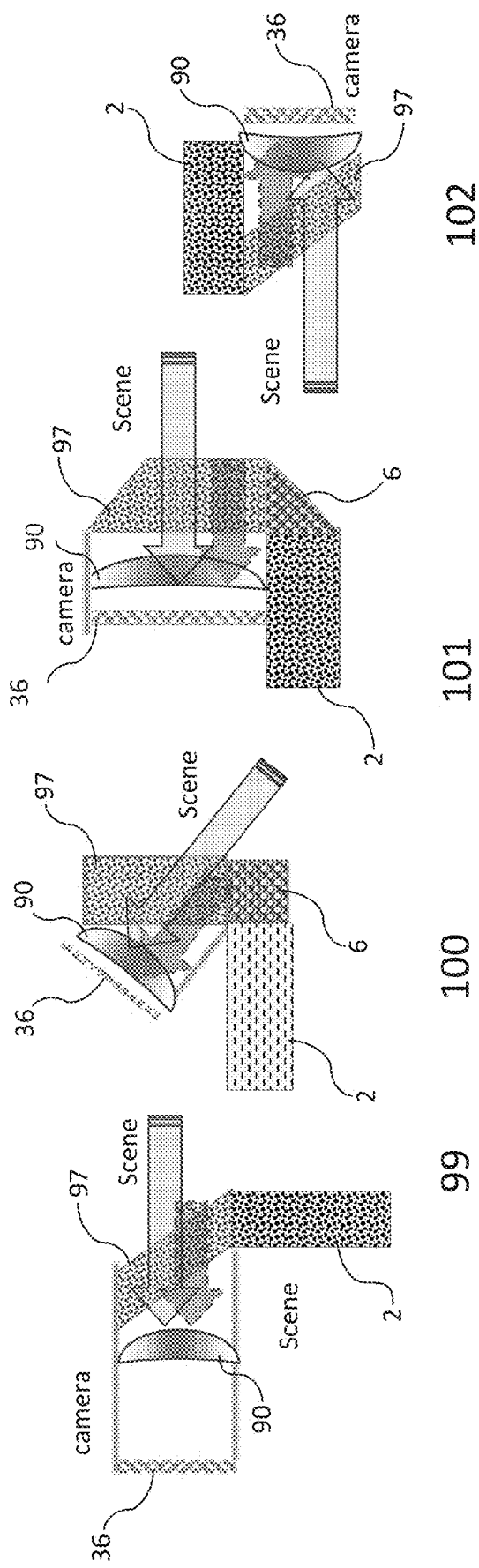
FIG. 15B illustrates schematic side views of example embodiments for hybrid camera-displays for augmented real-time visual effects with different aperture architectures.

FIG. 15B illustrates schematic side views of example embodiments for hybrid camera-displays for augmented real-time visual effects with different aperture architectures. An embodiment 99 is a schematic view of the same arrangement of components as in the embodiment 98. Another embodiment 100 is an altered version of the embodiment 71 that has a semi-transparent aperture box 97 and has imaging optics 90 (i.e., a lens) and an imaging sensor 36 in front of the semi-transparent aperture box 97. Consequently, the lens is used to image both the lightfield generated by the system as well as the light coming from the scene. In the embodiment 100, the light for the digital lightfield is generated in the FEC 2 and then is relayed by the reflective relay 6 upward to the semi-transparent aperture box 97. The light from the scene also gets into the semi-transparent aperture box 97 and is imaged by the lens onto the imaging sensor 36. An embodiment 101 is a lightfield display with extended active angled aperture that uses a semi-transparent aperture box 97. The light is generated in the embodiment 101, which is similar to the embodiment 81, and is then mixed with the light from the scene and imaged on the imaging sensor 36. An embodiment 102 uses an active folded aperture, which is similar to the embodiment 68, and uses a semi-transparent aperture box 97, which also allows the light from the scene to get through it. The mixed light is then imaged by imaging optics 90 (i.e., a lens group) that is placed in between the semi-transparent aperture box 97 and the imaging sensor 36.

Many of these hybrid display imaging embodiments can be used as augmented reality optics, which allows the imaging sensor 36 and the imaging optics 90 to be replaced with human eye.

Figure 15C:
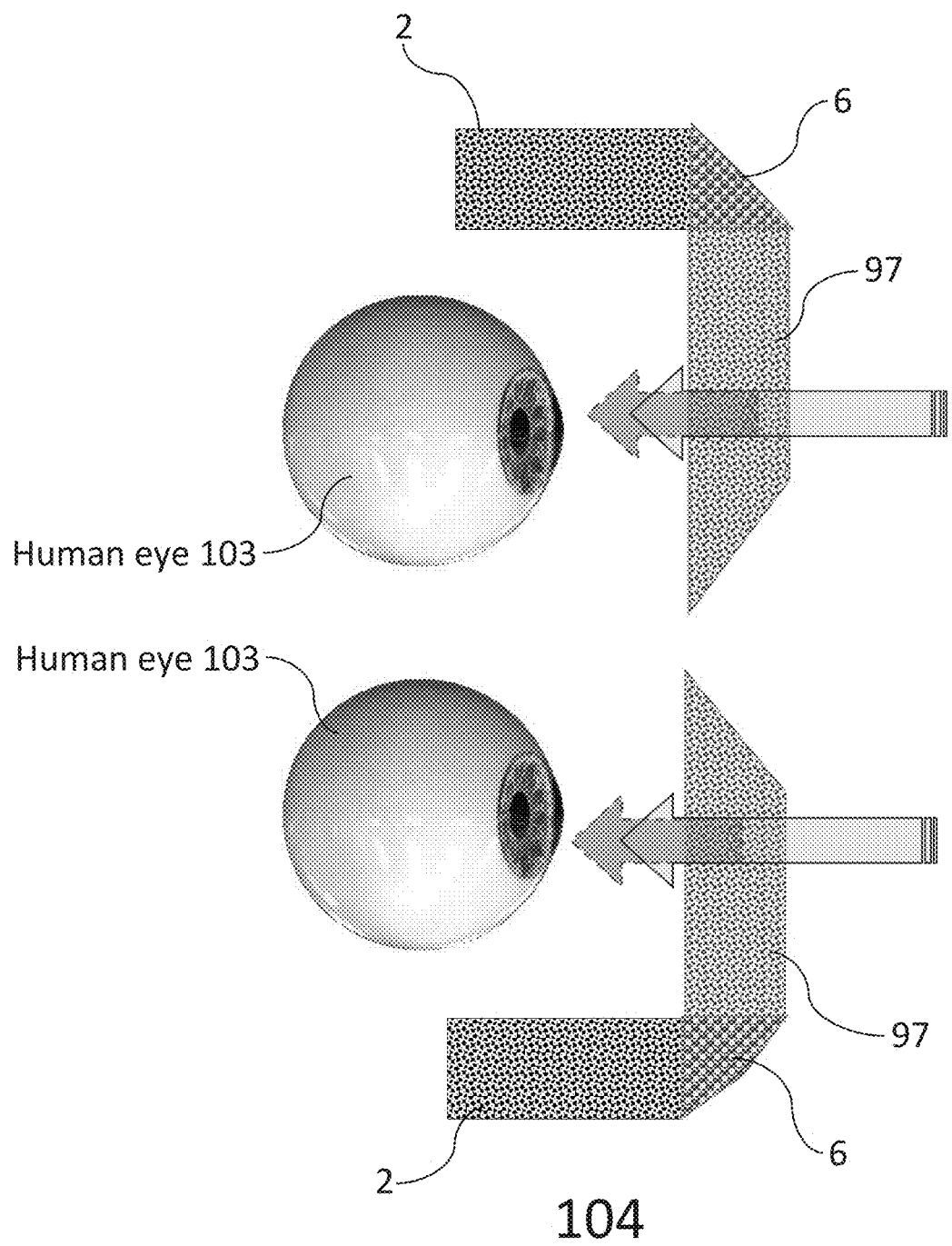
FIG. 15C illustrates schematic top views of an example embodiment using transparent actively extended aperture to augment an image for human eyes.

FIG. 15C illustrates schematic top views of an example embodiment using a transparent actively extended aperture to augment an image for human eyes 103. An embodiment 104 generates an image at the emissive display 1. In embodiment 104, the light goes through the FEC 2 and is relayed to an active transparent aperture 97 via the reflective relay 6 and then is mixed by the light that comes from the outside world.

Although the invention has been explained in relation to its preferred embodiment, it is to be understood that many other possible modifications and variations can be made without departing from the spirit and scope of the invention as hereinafter claimed.

What is claimed is:

1. A display system comprising:
   display panel to emit a plurality of portions of light;
   a first polarization-impacting layer, disposed after the display panel to transmit the plurality of portions of light, the first polarization-impacting layer comprising a first quarter-wave plate, a beam splitter, and a second-quarter wave plate;
   a polarization-dependent beam splitter disposed after the first polarization-impacting layer, the plurality of portions of light incident on polarization-dependent beam splitter; and
   a plurality of second polarization-impacting layers arranged in a row and disposed after the polarization-dependent beam splitter,
wherein,
   each of the plurality of portions of light is incident on at least one second polarization-impacting layer among the plurality of second polarization-impacting layers, and
   each second polarization-impacting layer among the plurality of second polarization-impacting layers comprising a first liquid crystal, a first reflective polarizer, a second liquid crystal, and a second reflective polarizer.

2. The display system of claim 1, wherein
   at least one portion of the plurality of portions of light is incident at least twice on at least (i) the first polarization-impacting layer, (ii) the plurality of second polarization-impacting layers, or (iii) the beam splitter, and
   the at least one portion of the plurality of portions of light produces an image having a monocular depth that is equal to an optical distance traveled by said at least one portion among the plurality of portions of light.

3. The display system of claim 1, wherein each second polarization-impacting layer among the plurality of second polarization impacting layers further comprises a quarter-wave plate and an absorptive polarizer.

4. The display system of claim 1, wherein
   a surface of the polarization-dependent beam splitter is oriented at an angle less than 45 degrees relative to a surface of the display panel,
   a first portion and a second portion of light among the plurality of portions of light are transmitted through the second plurality of polarization-impacting layers and thus exit the display system, and
   a first transverse distance between the first and second portions of light measured at emission from the display panel is different than a second transverse distance between the first and second portions of light measured upon exiting the display system.

5. The display system of claim 1, further comprising a control circuit to control each of the first liquid crystal and the second liquid crystal of the plurality of second polarization-impacting layers.

* * * * *